(12) United States Patent
Akbar

(10) Patent No.: US 7,852,831 B2
(45) Date of Patent: Dec. 14, 2010

(54) METHOD AND SYSTEM FOR PROVIDING PRIVATE VIRTUAL SECURE VOICE OVER INTERNET PROTOCOL COMMUNICATIONS

(76) Inventor: Imran M. Akbar, 216 Trinidad Dr., Tiburon, CA (US) 94920

( * ) Notice: Subject to any disclaimer, the term of this patent is extended or adjusted under 35 U.S.C. 154(b) by 1387 days.

(21) Appl. No.: 11/063,766

(22) Filed: Feb. 22, 2005

(65) Prior Publication Data

US 2006/0187900 A1 Aug. 24, 2006

(51) Int. Cl.
*H04L 12/66* (2006.01)
(52) U.S. Cl. .............. 370/352; 379/279; 370/466; 370/493; 709/227
(58) Field of Classification Search .......... 370/466, 370/493, 352; 379/279; 709/227
See application file for complete search history.

(56) References Cited

U.S. PATENT DOCUMENTS

| | | |
|---|---|---|
| 5,724,412 A | 3/1998 | Srinivasan |
| 5,805,587 A | 9/1998 | Norris |
| 5,907,547 A | 5/1999 | Foladare |
| 5,937,041 A | 8/1999 | Cardillo |
| 5,995,606 A | 11/1999 | Civanlar |
| 6,031,904 A | 2/2000 | An |
| 6,061,347 A | 5/2000 | Hollatz |
| 6,061,728 A | 5/2000 | Mead |
| 6,064,653 A | 5/2000 | Farris |
| 6,069,890 A | 5/2000 | White |
| 6,092,178 A | 7/2000 | Jindal |
| 6,157,648 A | 12/2000 | Voit |
| 6,175,869 B1 | 1/2001 | Ahuja |
| 6,185,194 B1 | 2/2001 | Musk |
| 6,192,045 B1 | 2/2001 | Williams |
| 6,233,318 B1 | 5/2001 | Pickard |
| 6,243,373 B1 | 6/2001 | Turock |
| 6,243,443 B1 | 6/2001 | Low |
| 6,260,070 B1 | 7/2001 | Shah |
| 6,263,371 B1 | 7/2001 | Geagan |
| 6,272,126 B1 | 8/2001 | Strauss |
| 6,278,704 B1 | 8/2001 | Creamer |
| 6,292,480 B1 | 9/2001 | May |
| 6,295,276 B1 | 9/2001 | Datta |
| 6,298,120 B1 | 10/2001 | Civanlar |
| 6,307,930 B1 | 10/2001 | Mayer |
| 6,314,105 B1 | 11/2001 | Luong |
| 6,324,280 B2 | 11/2001 | Dunn |
| 6,327,267 B1 | 12/2001 | Valentine |
| 6,327,622 B1 | 12/2001 | Jindal |
| 6,333,931 B1 | 12/2001 | LaPier |

(Continued)

*Primary Examiner*—Ahmad F Matar
*Assistant Examiner*—Antim Shah
(74) *Attorney, Agent, or Firm*—Lesavich High-Tech Law Group, P.C.; Stephen Lesavich

(57) ABSTRACT

A method and system for secure Voice over Internet Protocol (IP) (VoIP) communications. The method and system provide secure VoIP voice calls, video, Instant Messaging (IM), Short Message Services (SMS), or Peer-to-Peer (P2P) communications while maintaining privacy over the Internet and other communications networks such as the pubic switched telephone network (PSTN) to and from any network device through a virtual private network infrastructure interconnecting private VoIP network devices. The method and system allow a network device to function as an IP private branch exchange (PBX) or a private VoIP gateway and provide and control VoIP voice communications without using other public or private VoIP gateways or VoIP servers or devices on a communications network such as the PSTN or the Internet.

15 Claims, 9 Drawing Sheets

U.S. PATENT DOCUMENTS

| | | |
|---|---|---|
| 6,381,320 B1 | 4/2002 | Creamer |
| 6,389,005 B1 | 5/2002 | Cruickshank |
| 6,400,707 B1 | 6/2002 | Baum |
| 6,404,870 B1 | 6/2002 | Kia |
| 6,442,169 B1 * | 8/2002 | Lewis ................. 370/401 |
| 6,490,274 B1 | 12/2002 | Kim |
| 6,496,477 B1 | 12/2002 | Perkins |
| 6,539,077 B1 | 3/2003 | Ranalli |
| 6,584,490 B1 | 6/2003 | Schuster |
| 6,704,305 B2 | 3/2004 | Emerson |
| 7,330,463 B1 * | 2/2008 | Bradd et al. ............ 370/352 |
| 7,333,482 B2 | 2/2008 | Johansson |
| 2001/0010690 A1 | 8/2001 | Shen |
| 2001/0012285 A1 | 8/2001 | Shaharabani |
| 2001/0032234 A1 | 10/2001 | Summers |
| 2001/0055299 A1 | 12/2001 | Kelly |
| 2002/0024943 A1 | 2/2002 | Karaul |
| 2002/0041590 A1 | 4/2002 | Donovan |
| 2002/0057672 A1 | 5/2002 | Komuro |
| 2002/0057677 A1 | 5/2002 | Katzschner |
| 2003/0028648 A1 | 2/2003 | Calhoun |
| 2003/0153341 A1 | 8/2003 | Crockett |
| 2004/0008724 A1 * | 1/2004 | Devine et al. ............ 370/466 |
| 2005/0073964 A1 | 4/2005 | Schmidt et al. |
| 2006/0041431 A1 | 2/2006 | Maes |
| 2007/0005804 A1 | 1/2007 | Rideout |

* cited by examiner

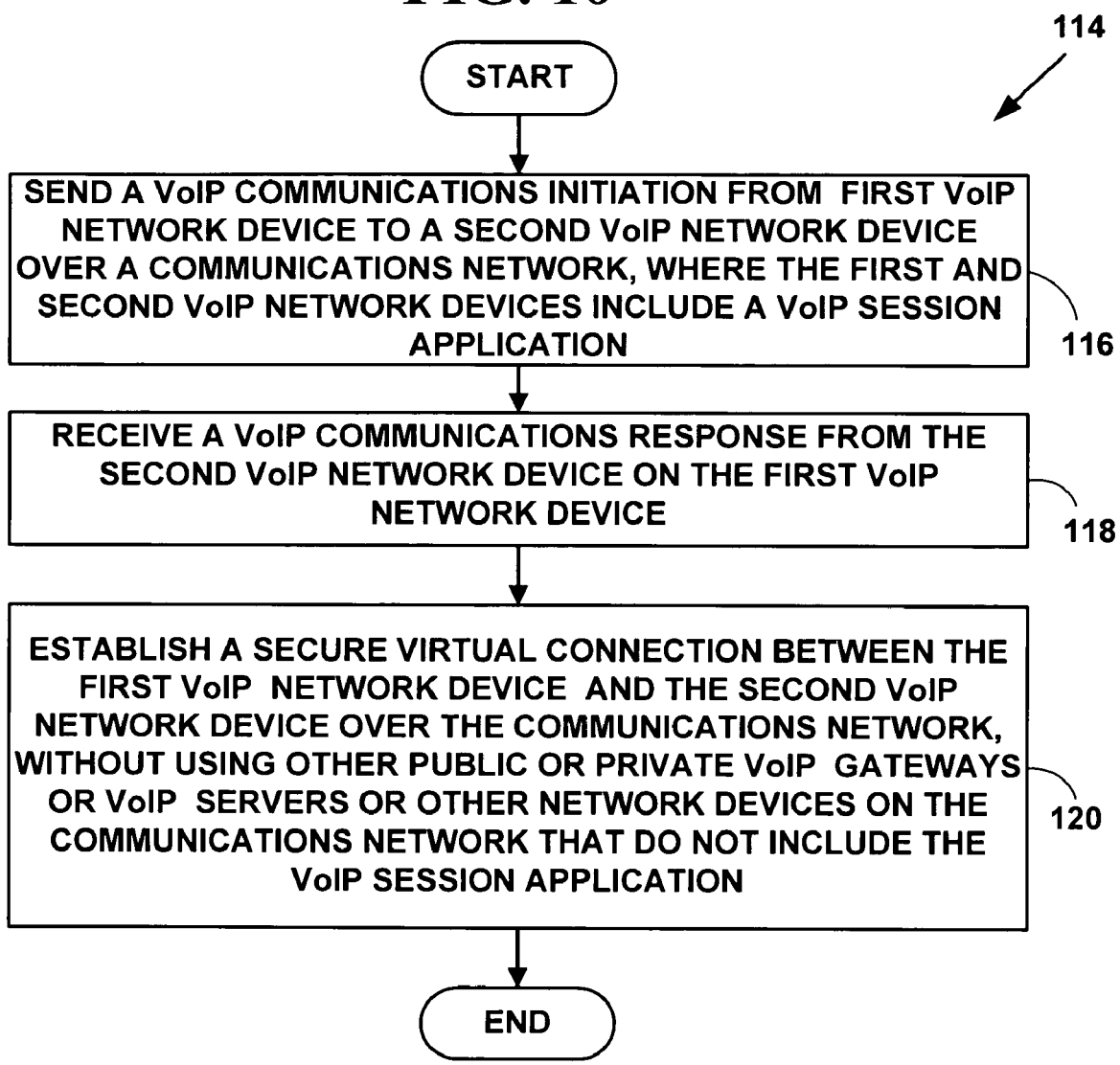

METHOD AND SYSTEM FOR PROVIDING PRIVATE VIRTUAL SECURE VOICE OVER INTERNET PROTOCOL COMMUNICATIONS

FIELD OF THE INVENTION

This invention relates to communications over communications networks.

More specifically, it relates to a method and system for providing private, virtual, secure Voice over Internet Protocol (VoIP) communications.

BACKGROUND OF THE INVENTION

In the art of network telephony, Internet Telephony and Internet Protocol (IP) telephony, and Voice over IP (VoIP) technology is split into hardware-only solutions, software solutions, and combinations of these two.

VoIP refers to the transfer of voice data over packet networks, and in most instances VoIP does not interconnect with the Public Switched Telephone Network (PSTN). VoIP software in this regard is only a computer-to-computer solution. Internet telephony, however, encompasses VoIP and extends it to interconnect with the PSTN; these solutions allow for computer-to-PSTN calls (and vice-versa), along with PSTN-to-PSTN calls which are routed through VoIP networks by carriers. VoIP software typically refers to computer-to-computer voice communication, while Internet Telephony software refers to computer-to-PSTN, PSTN-to-computer, or PSTN-to-PSTN solutions that utilize packet switching of voice and data.

Research into voice over packed-switched networks (such as the Internet) goes back to the mid-1980s. However, practical applications only began once the Internet came into widespread use. VoIP technology is beneficial when compared to previous technology; it has the potential to allow carriers and phone companies to make substantial savings in transferring calls between networks, because unlike the PSTN, all locations and calls through VoIP cost a negligible amount in terms of infrastructure regardless of where the call is being routed to or from. The PSTN which has been around for many decades is based on dedicated circuit-switched technology; even when a telephony device, such as a home or office phone, is not in use the dedicated circuit-switched technology remains in place and is unused, "wasting" resources.

In contrast, VoIP, which is a packet-switched technology, allows the resource of the underlying network to be used to carry voice conversations only when necessary. This efficiency results in substantial savings of hardware resources. The hardware solution that allowed for such efficiency, however, has remained in the realm of the business enterprise, and direct access to the technology has been software-based and very primitive in the consumer market.

Initially, consumer-oriented solutions were completely Software-based. These software solutions generally took the form of a VoIP "chat" utility running on a computer. The computer would be connected to a network, usually the Internet, and would allow the user to have a voice conversation with others using the computer's microphone and speakers, or a headset connected to the soundcard. Such a voice conversation required having a computer running the same software on both ends, and generally would not allow calls to or from regular telephones or telephone numbers. Solutions in this field currently include MSN Messenger, Yahoo Instant Messenger, ICQ, AOL Instant Messenger, and Trillian. Others such as Skype, Net2Phone, DeltaThree, Dialpad, Firefly, Glophone, MediaRing and a host of others allow outgoing calls to the PSTN via their networks. The more enterprise-oriented/standards-based softphones such as PhoneGaim, Xten's Xlite, Pulver Communicator, SJLabs's softphone, and others can be connected to VoIP carriers to place and receive calls to other SIP users and the PSTN for a fee, but this capability is not integrated into the Software.

While the technology and quality of service in this realm has advanced, the basic capabilities and limitations of such software solutions remain the same. Today these services allow users to call a regular phone number anywhere in the world at significantly reduced rates as compared to standard international direct dial (IDD) rates and in some cases receive calls from a real telephone number. However, the user is still restricted to accessing the VoIP service through the physical hardware of a computer. There have been attempts to connect such software to a VoIP adapter to use them with regular phones and phone lines, but these devices such as the Siemens Gigaset and adapters from Cuphone and PCPhoneLine only work as adapters with other software and therefore can't offer advanced functionality, nor are they gateways between VoIP and the PSTN.

Such gateways and IP-Personal Branch Exchanges (IP-PBXs) do exist, but have been constrained to the enterprise and small office space, not the consumer marketplace. The reasons for this include the large cost and nature of devices, the dedicated hardware required, and the technical knowledge required to set up the underlying network.

A recent attempt to solve the problems of moving VoIP technology into the consumer marketplace has been the adoption of smaller-scale VoIP adapters. These consumer VoIP adapters offer consumers the functionality of a normal telephone line using the Internet. The customer does use a regular telephone with the service, and the service routes calls to and from the telephony device through the Public Switched Telephone Network (PSTN). However, unlike the capabilities of the aforementioned enterprise systems, users are not able to directly interconnect their devices or access a local telephone line through the device because the calls are routed through remote servers which connect consumers' VoIP adapters to the PSTN. These services include those offered by Vonage, AT&T's CallVantage program, Packet8, VoicePulse, Broadvoice, and others. Recently adapters from manufacturers such as Sipura, Vegastream, Grandstream, i2Telecom, and Leadtek have expanded to include both connections to a regular phone set and a user's existing phone line, but many do not have gateway functionality to bridge these to and/or from VoIP services or any way to easily connect directly to other users. In addition, no service provider currently allows these devices to function as gateways on their networks.

Another solution is the use of Asterisk, the open-source Private Branch Exchange (PBX) system that runs on specific hardware and uses the Linux operating system. Such a system gives the user flexibility to customize the interconnection between the VoIP functionality and the PSTN. Such systems even include the capability to connect PBXs together over a network, including the Internet. Bellster is one such site where users can share their lines, but again, it is restricted to Asterisk and has little or no control capabilities or integrated Software. However, such platforms are very hard to get set up, require specific hardware, and technical knowledge of Linux based PBX VoIP systems.

The consumer-oriented, personal VoIP-PBX system detailed in this application would provide solutions to all of these issues. Such a consumer-oriented PBX would be easily connected and configured through a computer to send and receive calls, as well as bridge the PSTN with the VoIP network in both directions. Prototypes of such gateways exist, but are limited because they are not integrated with any VoIP Software/network and don't include basic telephony features such as both connections to a telephone handset and a line, caller ID, voltage monitoring, or line impedance matching. Another option is to integrate an FXO port into existing modems that are included in every computer sold today, a capability that is not currently available.

The concept of a virtual private network has been capitalized upon by enterprises which use the Internet to connect together their separate phone systems in different locations so that phone calls can be made across the world for free. If gateways are actually installed on all the premises, remote users can access another user's phone line and make a local call on it—essentially eliminating international long distance charges. With the personal PBX described above, such capabilities would now be in the realm of normal individuals, allowing them to share each other's phone lines easily and with security.

To date, the instant-messaging networks (America Online's, for example) have been independent of the hosted Internet telephone networks (Vonage, etc.). The hosted Internet telephone operators have concentrated thus far on simply replacing the traditional phone service with a digital one—without giving users any additional IP-functionality besides receiving voice mail through email or using a softphone. Ideally the users would be networked together so that users can pick up their phone and hear which of their contacts' are online, and users who are using softphones should be able to see other user's phones as contacts in their buddy lists.

One of the major problems has been tackling the issue of firewall traversal, which has traditionally been solved by connecting through a dedicated server which proxies signals to and from you to other users. With a peer-to-peer system this can be eliminated by having other peers act as servers for those who need it.

In addition, spam over Internet telephony (SPIT) and spam over instant messaging (SPIM) have become greater problems, namely because the user has to make a decision on whether or not to accept without knowing anything about the sender or the actual data itself. The proposed system calculates ratings for each user automatically based on their activity and feedback from other users. The same technique is applied to spam e-mail, the rationale being that once one person on the network receives and marks the spam as such, and the knowledge can be spread to the rest of the network to alert them to the e-mail as well. The advantage of such a system is that it follows and extends Metcalfe's law in that not only its utility but also efficiency increases as the square of the number of its users. By forging one united front and having shared distributed intelligence, the system defends itself and its members from spam e-mails. This concept has been implemented before with Vipol's Razor and Cloudmark, but has not been adopted in a peer-to-peer network that would allow its growth to flow unencumbered. In addition, current systems do not do automatic rating of e-mails or identities.

Current VoIP softphones can be used with Bluetooth headsets, but none of these programs actually have built-in support for making or receiving calls from a headset, such as a mobile phone that is within range. In addition, with the current invention the softphone can actually be paired with a handset to actually allow users to dial in numbers on their phone and route the call through VoIP, as well as receiving calls as you normally would with a mobile phone.

Ideally, mobile phone users would be able to directly connect to other users over a packet-switched connection such as GPRS, but currently this is too expensive and there are no softphones available that have this capability. The next step would be to have such a service integrated into the mobile phone operators' base stations so your number can be accessed both through a softphone and your mobile.

Only with the combination of a software solution and a hardware solution can users have a gateway that uses normal phones/landlines and VoIP technology and allows seamless communication with other users anywhere in the world with a minimum of expense and resources over a network, such as the Internet.

There have been attempts to solve some of the problems associated with VoIP. For example, U.S. Pat. No. 6,671,272 (2003), an "Internet switch box, system and method for Internet telephony." This patent uses a USB connection with basic hardware to connect a phone directly to a server. There is no client software or connection to any telephony devices. Another patent is U.S. Pat. No. 6,665,293 (2003), "Application for a voice over IP (VoIP) telephony gateway and methods for use therein." This patent describes a network topology using PBXs, but the network is not connected to a user's computer and cannot be configured using Software. Other attempts include U.S. Pat. Nos. 6,700,956 (2004), 6,778,652 (2004), 6,473,423 (2002), 6,243,373 (2001), 6,345,047 (2002), 6,704,305 (2004), 6,760,324 (2004), and 6,438,124 (2002).

Other attempts include U.S. published patent applications 20030076817, 20030088767, 20030091177, 20030244940, 20040180624, 20040192292, 20020101860, 20020131577, 20030002476, 20040086100, 20040105432, 20040116108, and 20040116154.

Instant-messenger based VoIP software exists today, but is limited in functionality. Examples include Skype, Pulver Technology's Pulver communicator Software, Grouper, PhoneGaim, and Qnext. Pulver Communicator does not include file sharing and is not peer-to-peer, but instead routes phone calls through central servers. Grouper does not use existing instant messaging networks, and neither Grouper nor Qnext support Session Initiation Protocol (SIP) outside of their own networks, or social networking. Skype uses proprietary protocols in a peer-to-peer network for PC-to-PC calling.

However, these inventions still do not solve all of the problems associated with VoIP communications. Thus, it is desirable that for combination of hardware and software with the topology that yields a fully integrated Internet telephony system with advanced flexibility and a variety of communication means to be provided.

SUMMARY OF THE INVENTION

In accordance with preferred embodiments of the present invention, some of the problems associated with VoIP are overcome. A method and system for secure Voice over Internet Protocol (IP) (VoIP) communications.

The method and system provide secure VoIP voice calls, video, Instant Messaging (IM), Short Message Services (SMS), or Peer-to-Peer (P2P) communications while maintaining privacy over the Internet and other communications networks such as the pubic switched telephone network (PSTN) to and from any network device through a virtual private network infrastructure interconnecting private VoIP network devices. The method and system allow a network device to function as an IP private branch exchange (PBX) or a private VoIP gateway and provide and control VoIP voice communications without using other public or private VoIP gateways or VoIP servers or devices on a communications network such as the PSTN or the Internet.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 10 is a flow diagram illustrating a method for or creating a virtual private network infrastructure connection for VoIP communications.

DETAILED DESCRIPTION OF THE INVENTION

Exemplary Communications System

Figure 1:
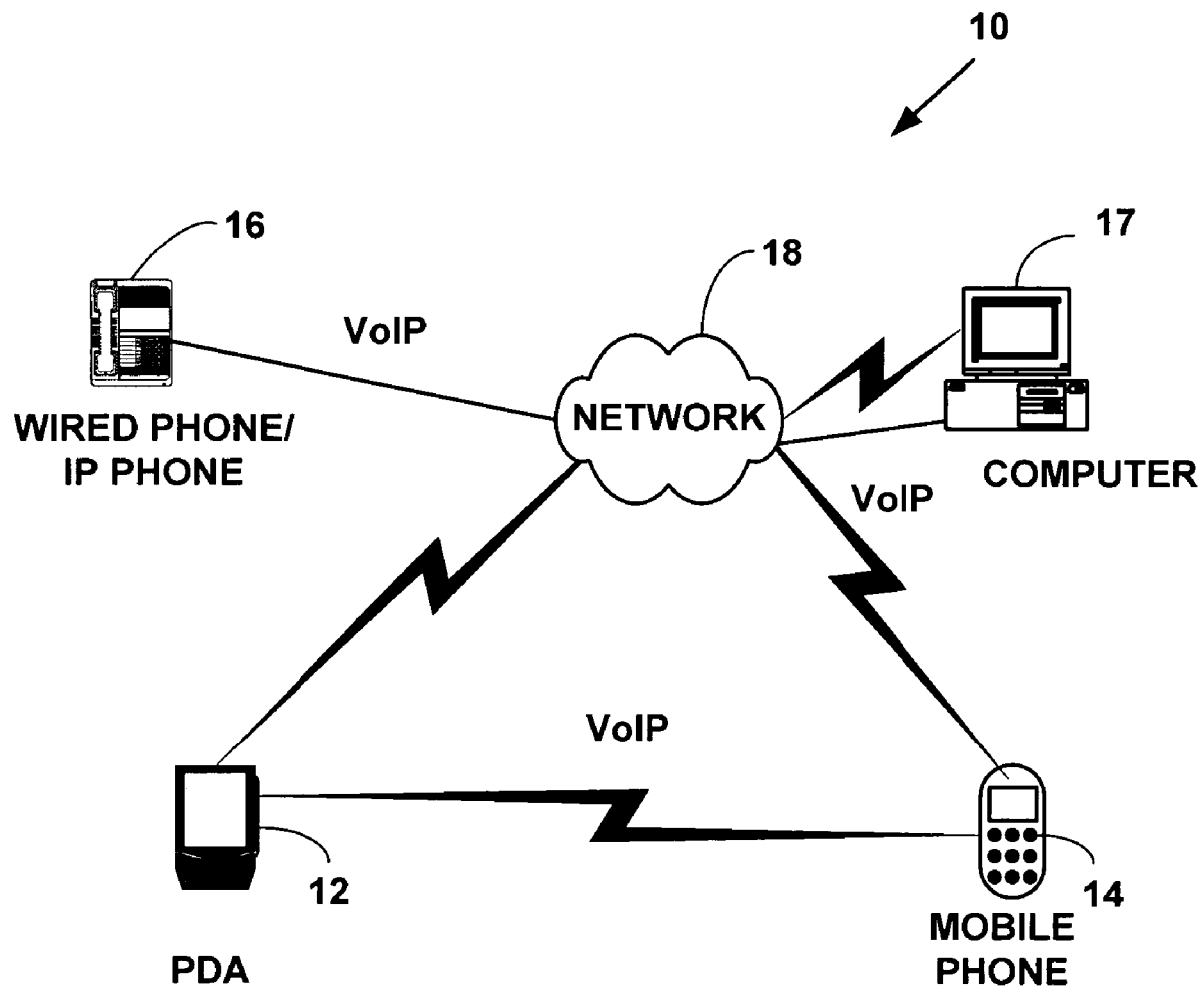
FIG. 1 is a block diagram illustrating an exemplary communications system.

FIG. 1 is a block diagram illustrating an exemplary communications system 10. The exemplary communications system 10 includes plural network devices 12, 14, 16, 17 (four of which are illustrated). The plural network devices 12, 14, 16, 17 include, but are not limited to, multimedia capable desktop and laptop computers, facsimile machines, mobile phones, non-mobile phones, Internet phones, Internet appliances, personal digital/data assistants (PDA), two-way pagers and other types of network devices. The plural network devices 12, 14, 16, 17 include one or more of a wired interface and/or a wireless interface used to connect to a communications network 18 to provide voice, video and data communications.

The communications system 10 further includes a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18 providing voice, video and data communications.

The communications network 18 may include one or more gateways, routers, or bridges. As is known in the art, a gateway connects communication networks using different communication or networking protocols and/or operating at different network transmission capacities. A router receives transmitted messages and forwards them to their correct destinations over the most efficient available route. A bridge is a device that connects networks using the same communications protocols so that information can be passed from one network device to another.

The communications network 18 may also include one or more servers or access points (AP) including wired and wireless access points (WAP) (not illustrated).

In one embodiment, the one or more servers include one or more VoIP servers. In another embodiment, the one or more servers include one or more Internet Protocol servers.

The communications network 18 includes data networks using the Transmission Control Protocol (TCP), User Datagram Protocol (UDP), Internet Protocol (IP) and other data protocols.

The communications network 18 may also include portions of a PSTN or cable television network that connect the network devices 12, 14, 16, 17 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

Preferred embodiments of the present invention includes network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, the ADSL Forum, or the Voice over Internet Protocol Forum. However, network devices and interfaces based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com." Voice over Internet Protocol documents can be found at the URL "www.voip-info.org."

An operating environment for network devices and interfaces of the present invention include a processing system with one or more high speed Central Processing Unit(s) (CPU) or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM)) mass storage system readable by the CPU. The computer readable medium includes cooperating or interconnected computer readable medium, which exist exclusively on the processing system or be distributed among multiple interconnected processing systems that may be local or remote to the processing system.

In one embodiment of the present invention, the wireless interfaces used for the plural network devices 12, 14, 16, 17 include but are not limited to, an IEEE 802.11a, 802.11b, 802.11g, 802.11n, "Wireless Fidelity" (Wi-Fi), "Worldwide Interoperability for Microwave Access" (WiMAX), ETSI High Performance Radio Metropolitan Area Network (HIPERMAN), "RF Home" or other wireless interfaces.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

Exemplary Protocol Stack

Figure 2:
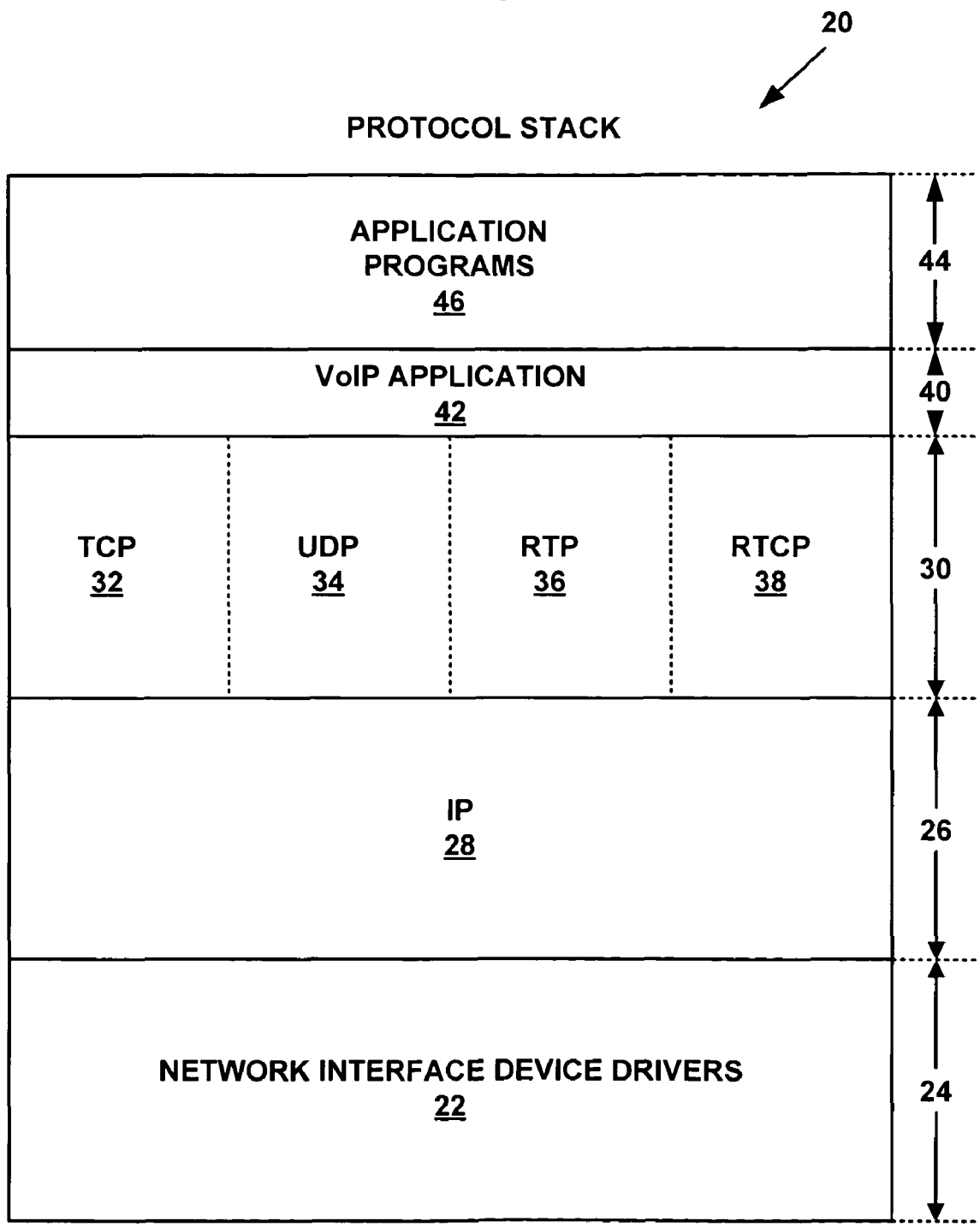
FIG. 2 is a block diagram illustrating a layered protocol stack.

FIG. 2 is a block diagram illustrating a layered protocol stack 20 for network devices 12, 14, 16, 17. The one or more network devices include a protocol stack 20 with multiple layers based on the Internet Protocol (IP) or Open Systems Interconnection (OSI) models.

As is known in the art, the IP reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

Referring to FIG. 2, the plural network devices 12, 14, 16, 17 are connected to the communications network 18 with Network Interface Card (NIC) device drivers 22 in a link layer 24 for connecting the network devices to the communications network 18. For example, the NIC device drivers 22 may include a serial port device driver, a modem device driver, an Ethernet device driver, a wireless interface device driver, etc. The device drivers interface with the actual hardware being used to connect the plural network devices to the communications network 18.

Above the link layer 24 is a network layer 26 (also called the "Internet Layer" for IP suites). The network layer 26 includes, but is not limited to, an IP application 28, hereinafter IP 28. As is known in the art, IP 28 is an addressing protocol designed to route traffic within a network or between networks. IP 28 is described in IETF Request For Comments (RFC)-791, the contents of which are incorporated herein by reference. However, more fewer or other protocols can also be used in the network layer 26, and the present invention is not limited to IP 28.

Above network layer 26 is a transport layer 30. The transport layer 30 includes, but is not limited to, a TCP application 32, a UDP application 34, a Real-Time Protocol (RTP) application 36 and a Real-Time Control Protocol (RTCP) application 38. However, more, fewer or other protocols could also be used in the transport layer 30.

The TCP application 32, hereinafter TCP 32, provides a connection-oriented, end-to-end reliable protocol designed to fit into a layered hierarchy of protocols which support multi-network applications. TCP 32 provides for reliable inter-process communication between pairs of processes in network devices attached to distinct but interconnected networks. For more information on TCP 32 see ITEF RFC-793, the contents of which are incorporated herein by reference.

The UDP application 34, hereinafter UDP 34, provides a connectionless mode of communications with datagrams in an interconnected set of computer networks. UDP 34 provides a transaction oriented datagram protocol, where delivery and duplicate packet protection are not guaranteed. For more information on UDP 34 see IETF RFC-768, the contents of which incorporated herein by reference. Both TCP 32 and UDP 34 are not required in protocol stack 20 and TCP 32 or UDP 34 can be used alone without the other.

The RTP application 36, hereinafter RTP 36, provides a transport protocol used in delivering real-time data, including audio and video. RTP 36 works with both unicast (single sender, single recipient) and multicast (single sender, multiple recipients) services. For more information on RTP 36, see IETF RFC-1889, and RFC-3350 the contents of which are incorporated by reference.

The RTCP application 38, hereinafter RTCP 38, provides a control protocol for the delivery of streamed multimedia data over IP 28 networks. RTCP 38 is designed to deliver real-time, live, or stored audio and video efficiently over a communications network 18. It can be used either for groups of recipients or for on-demand delivery to a single recipient. For more information on RCTP 38, see IETF RFC-3350, the contents of which are incorporated by reference.

Above the transport layer 30 is a session layer 40 where a Voice over Internet Protocol (VoIP) application 42 resides. The software helps provide VoIP communications as is explained below. In this embodiment, the VoIP application is in the session layer 30. In another embodiment, the software resides in an application layer 44. However, the present invention is not limited to these embodiments and other embodiments can also be used to practice the invention.

Above session layer 40 is an application layer 44 where application programs 46 (e.g., application programs 46 that use H.323, H.324, H.264, Session, Initiation Protocol (SIP), etc.) to carry out desired functionality for a network device reside.

However, the protocol stack 20 is not limited to the protocol layers illustrated and more, fewer or other layers and protocols can also be used in protocol stack 20. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), Domain Name System (DNS), etc.), audio coder/decoders (CODEC), video codecs and protocols from other protocol suites may also be used in protocol stack 20.

During an audio/video conferencing call or a voice call on network devices 12, 14, 16, 17, audio information is typically supplied by audio equipment (e.g., a handset, microphone/speaker, speaker-phone, etc.) that implements voice transmission functions and typically include at least one voice codec that sends and receives packetized voice to capture audio information.

For example, the audio codecs used in network devices 12, 14, 16, 17 are compliant ITU-T G.711, G.722, G.723, G.728, G.729 standards, or iLBC, Speex ADPCM standards, the contents of all which are incorporated herein by reference. Global System for Mobile Communications (GSM) codecs can also be used. As is known in the art, GSM is a digital cellular telephone technology widely used throughout Europe, in Australia, India, Africa, Asia, and the Middle East, and growing in use in the United States. The ITU-T GSM codec standards are incorporated herein by reference. However, other audio codecs could also be used and the present invention is not limited to such audio codecs.

During audio/video conference calling, video information is typically supplied by video equipment (e.g., video cameras, etc.) In one embodiment of the present invention, Motion Pictures Expert Group (MPEG-2), MPEG-4/H.264 or Video Coding Experts Group (VCEG) codecs are used.

As is known in the art, MPEG is a set of standards for audio and video compression established by the Joint ISO/IEC Technical Committee on Information Technology. The original MPEG standard for storing and retrieving video and audio information, was designed for CD-ROM technology.

As is known in the art, MPEG-1 defines data cell encoding for a medium bandwidth of up to 1.5 Mbps, two audio channels, and non-interlaced video. MPEG-2 is an extension of the MPEG-1 standard designed for broadcast television, including HDTV. MPEG-2 defines a higher bandwidth of up to 40 Mbps, five audio channels, a wider range of frame sizes, and interlaced video.

As is known in the art, MPEG-2 in general is defined in the ISO/IEC Standard JTC1/SC29/WG11, entitled "Coding of Moving Pictures and Audio," incorporated herein by reference. MPEG-2 is also defined by the ITU-T H.222.0, standard entitled "Generic coding of moving pictures and associated audio information," the contents of which is incorporated herein by reference. However, other audio/video and video codecs could also be used and the present invention is not limited to the MPEG codecs described.

As is known in the art, VCEG defines a data cell encoding for third generation (3G) mobile networks. The ITU-T Q.6/SG156 standard is incorporated herein by reference.

Security and Encryption

Communications over communications network 18 often require encryption or other types of security methods to provide secure communications between one or more or the plural network devices 12, 14, 16, 17 for voice, video and/or data communications over communications network 18. The plural network devices 12, 14, 16, 17 include one or more of the following security and/or encryption techniques to provide secure communications.

Wireless Encryption Protocol (WEP) (also called "Wired Equivalent Privacy) is a security protocol for WiLANs defined in the IEEE 802.11b standard. WEP is cryptographic privacy method, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

The IEEE 802.11 Working Group is working on a security upgrade for the 802.11 standard called "802.11i." This supplemental draft standard is intended to improve WiLAN security. It describes the encrypted transmission of data between systems 802.11xx WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption method as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption methods between wireless access points and wireless devices. The authentication schemes proposed in the draft standard include Extensible Authentication Protocol (EAP). One proposed encryption method is an Advanced Encryption Standard (AES) encryption method.

Dynamic negotiation of authentication and encryption methods lets RSN evolve with the state of the art in security, adding methods to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher method. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption method that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption methods.

Secure Hash Method (SHA), is used for computing a secure condensed representation of a data message or a data file. When a message of any length less than $2^{64}$ bits is input, the SHA-1 produces a 160-bit output called a "message digest." The message digest can then be input to other security techniques such as encryption, a Digital Signature Method (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 method is intended for digital signature applications, where a large file must be "compressed" in a secure manner before being encrypted with a private (secret) key under a public-key cryptosystem such as RSA. The IETF RFC-1321, entitled "The MD5 Message-Digest Method" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called message authentication codes. Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

As is known in the art, "firewalls" are a security feature used to protect a network from potentially hostile attacks from outside the network. For example, a firewall may protect the network devices from malicious attacks from the Internet or another network. Firewalls typically provide security services by filtering out data traffic that may be inappropriate, suspicious or dangerous. To implement filtering, a firewall is designed to interpret the type of data traffic that is being sent through it. The more information that a firewall has about transactions taking place through it, the more security it can provide.

Firewall security mechanisms include packet filtering. Packet filtering includes using the content of data packets passing through the firewall to determine if a packet should be allowed to pass through the firewall. For example, data-link layer addresses such as Media Access Control (MAC) and Logical Link Control (LLC) addresses, network addresses such as IP 28 addresses and source and destination transmission port numbers, such as TCP 32 or UDP 34 port numbers are used to filter data traffic.

VoIP firewall packet filtering includes a Network Address Translation (NAT) traversal firewall with full cone, restricted cone, port restricted cone and/or symmetric packet filtering.

For full cone NAT firewalls, a pre-defined (IP address 28::port scheme) is used. For example, a network device 12, 14, 16, 17 with a NAT with IP 28 address of 10.0.0.1 sending and receiving on port 8000, is mapped to an external IP 28 address and port on the NAT (e.g., 192.128.234.103::1000). The NAT firewalls acts a packet filter. Any communications device 12, 14, 16, 17 on the communications network 18 can send packets to the NAT's IP address and port and those packets will be passed on to the network device 12, 14, 16, 17 listening on 10.0.0.1::8000 if appropriate, otherwise they are filtered at the NAT.

For restricted cone NAT firewalls, an external IP::port pair for the NAT is only usable once a network device 12, 14, 16, 17 sends out data to a specific destination IP 28 address. For example, in the case where a network device 12, 14, 16, 17 sends out a packet to external network device-1, the NAT maps the 10.0.0.1::8000 to 192.128.234.103::1000, and external network device-1 can send back packets to that network device 12, 14, 16, 17. However, the NAT will block packets coming from external network device-2, until the network device 12, 14, 16, 17 sends out a packet to external network device-2 IP address. Once that is done, both external network device-1, external network device-2 can send packets back to the network device 12, 14, 16, 17 and they will both have the same mapping through the NAT.

A port restricted cone NAT firewall is almost identical to a restricted cone, but a port restricted NAT will block all packets unless a network device 12, 14, 16, 17 has previously sent out a packet to an IP 28 address and port that is sending to the NAT. So if the network device 12, 14, 16, 17 sends a packet to external network device-1, the NAT will only allow through packets to the network device 12, 14, 16, 17 that come from the IP 28 address::port of external network device-1. If a network device 12, 14, 16, 17 has sent out packets to multiple IP 28 address::port pairs, they can all respond to the network 12, 14, 16, 17, and all of them will respond to the same mapped IP 28 address::port on the NAT.

A symmetric NAT firewall is different from the first three in that a specific mapping of internal IP 28 address::port to a NAT's public IP address 28::port is dependant on a destination IP address that a packet is sent to. So for example, if a network device 12, 14, 16, 17 sends a first packet from 10.0.0.1:8000 to a first external device-1, it may be mapped as 192.128.234.103::1000, whereas if the network device 12, 14, 16, 17 sends from the same port (10.0.0.1:8000) to a second external device-2 at a different IP 28 address, it is mapped differently (192.128.234.103::2000). The NAT would block other packets not send to these two IP 28 addresses.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP 32/IP 28) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL "netscape.com/eng/security/SSL_2.html."

As is known in the art, Transport Layer Security (TLS) provides communications privacy over the Internet. The protocol allows client/server applications to communicate over a transport layer (e.g., TCP 32, UDP 34) in a way that is designed to prevent eavesdropping, tampering, or message forgery. For more information on TLS see IETF RFC-2246, incorporated herein by reference.

In one embodiment of the invention, MAC address filtering is used. As is known in the art, MAC addresses are hardware addresses that are burned into a device during its manufacture and are unique for each device. Without MAC address filtering, any wired wireless client can request access to a wired or wireless network.

As is known in the art, a "tunnel" is used encapsulate or wrap a data packet or a data message from one protocol in a data packet or data message for another. The wrapped packet is then transmitted or "tunneled" via the protocol of the encapsulator or wrapper.

In one embodiment of the invention, Layer 2 Tunneling Protocol (L2TP) is used. As is known in the art, L2TP is a secure tunneling protocol used for connecting VPNs over public links such as those connected to the Internet. The IETF Internet Draft, Layer Two Tunneling Protocol, <draft-ietf-pppext-12tp-mpls-02.txt> is incorporated herein by reference.

In one embodiment of the invention, Internet Protocol Security (IPsec) is used. As is known in the art, IPsec is security protocol that provides authentication and encryption over the Internet. Unlike SSL, which provides services at the transport layer 30 (e.g., OSI layer 4) and secures two applications, IPSec works at the network layer 26 (i.e., the OSI layer 3) and secures networks including VPNs. IPsec also provides secure communications for VPNs. For more information on IPsec see IETF RFC-2401, the contents of which are incorporated by reference.

However, the present invention is not limited to the security or encryption techniques described and other security or encryption techniques can also be used.

Voice Over Internet Protocol (VoIP) Communications

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, H.264, DNS, AAA, etc.) that convert a voice signal into a stream of packets (e.g., IP 28 packets) on a packet network and back again. VoIP allows voice signals to travel over a stream of data packets over a communications network 18.

As is known in the art, Session Initiation Protocol (SEP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of a family of video conferencing recommendations for IP networks. The ITU-T H.323 standards entitled "Packet-based multimedia communications systems" dated 02/98, 09/99, 11/00 and 07/03 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated 02/98 and 03/02 are incorporated herein by reference.

As is known in the art, H.264 (or MPEG-4Part 10) is a draft standard that does not explicitly define a CODEC. Rather, the H.264 standard defines a syntax of an encoded video bitstream together with the method of decoding this bitstream. The ITU-T H.264 standard entitled "Advanced Video Coding," Document JVT-E022, September 2002, is incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers 17, handheld devices, PDAs 12 or other devices such as non-mobile 16 and mobile phones 14 that connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

Exemplary VoIP Hardware

Figure 3:
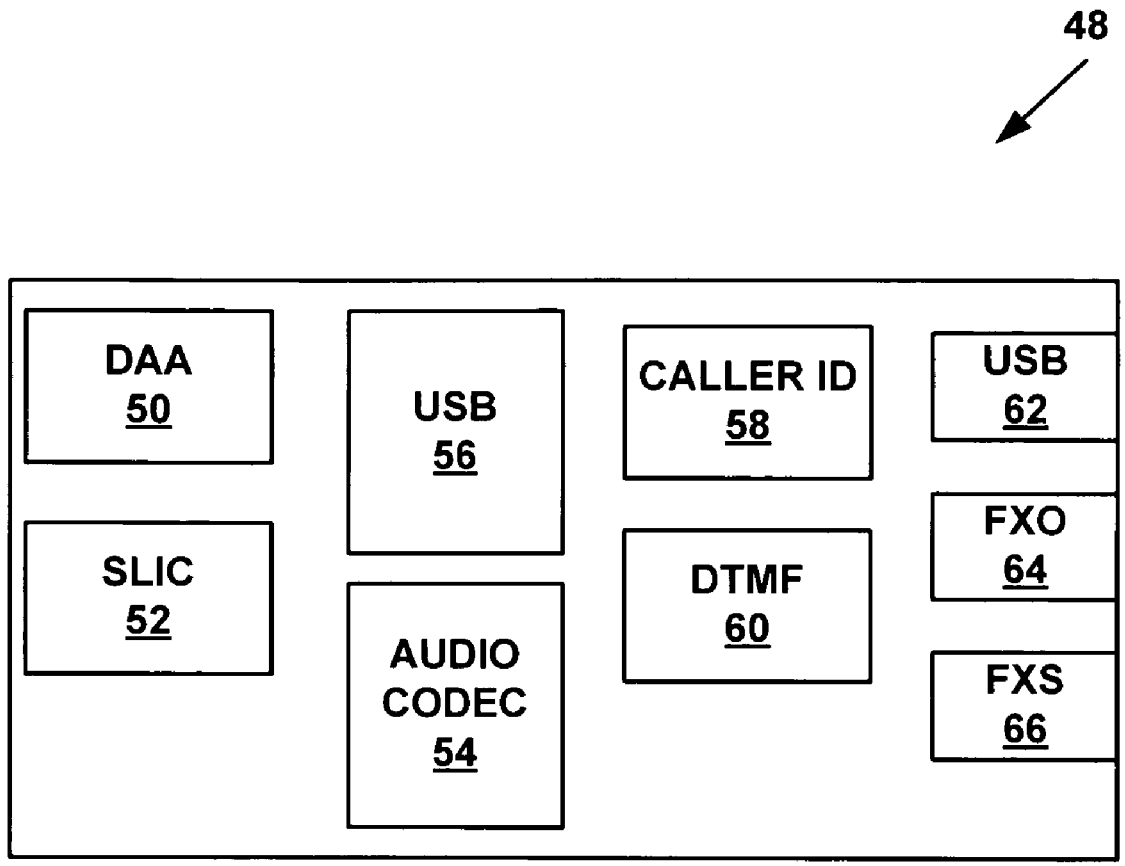
FIG. 3 is a block diagram illustrating an exemplary VoIP hardware device.

FIG. 3 is a block diagram illustrating an exemplary VoIP hardware device 48. The exemplary VoIP hardware device includes, but is not limited to, a Data Access Arrangement (DAA) chip 50, a Serial Line Interface Circuit (SLIC) chip 52, an audio CODEC 54, a Universal Serial Bus (USB) chipset 56, a Caller Identification (Id) decoder chipset 58, a Dual Tone Multi-Frequency (DTMF) decoder 60, a USB port 62, a Foreign Exchange Office (FXO) interface 64 and a Foreign Exchange Solution (FXS) interface 66. However, the present invention is not limited to such an embodiment and more, fewer or other components can also be used to practice the invention. For example, the VoIP hardware device may further include a video CODEC.

Figure 4:
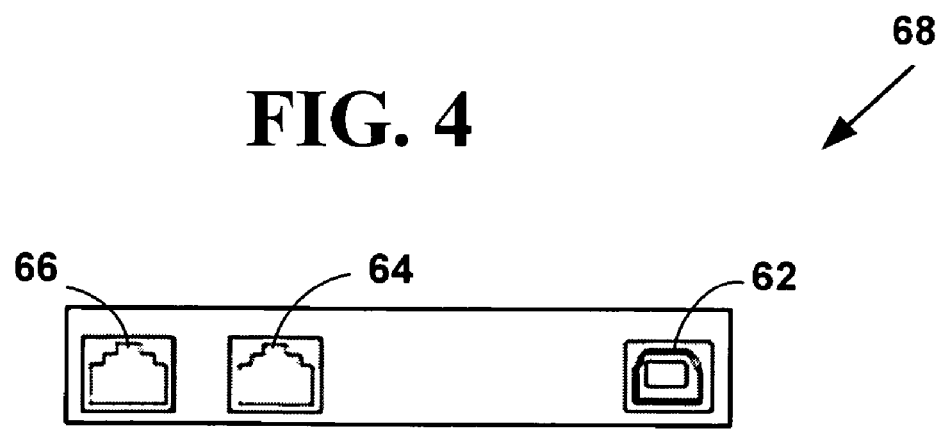
FIG. 4 is a block diagram illustrating a side view 68 of the exemplary VoIP hardware device of FIG. 3.

FIG. 4 is a block diagram illustrating a side view 68 of the exemplary VoIP hardware device of FIG. 3. The side view 68 illustrates the FXS interface 66, the FXO interface 64, and the USB port 62.

In one embodiment, the FXO interface 64, and the FXS interface 66 are controlled by integrated circuits including the DAA 50 and SLIC 52, respectively.

The DAA 50 is used to connect to the PSTN. The DAA 50 is also used to make and receive voice calls. The DAA 50 is analogous to a conventional analog modem used to connect to a dial-up Internet Service Provider, except in a much smaller package with more control capabilities. The DAA 50 connects to a regular telephone line and can detect when the line is ringing and can dial out a number. The DAA 50 can answer a ringing line and can detect DTMF digits input by a user and pass them along to the DTMF decoder 60.

An impedance and gain for a phone line the DAA 50 is operating on can be customized through registers in the chip itself to match country-specific requirements. The DAA 50 includes an integrated voltage/current meter in order to detect not only when a handset is/is not in use, but when another handset on the same line goes off hook. The DAA 50 determines when a handset is off hook, a voltage on the line decreases significantly. Any further handsets that go off hook decrease the voltage only slightly. When the user replaces the handset and the handset goes on hook, the voltage returns to its normal voltage.

The SLIC chip 52 is used to interface with a locally-attached telephone handset, and has the capability to detect when a telephony handset is off hook and can initiate ringing. The SLIC 52 is in some respects is the complement to the DAA 50 in terms of functionality; it allows the VoIP hardware device 48 to detect when a telephone handset is on/off-hook, and passes along DTMF signals to a DTMF decoder. DTMF signals are the signals generated when a user presses a button on telephone keypad, including either a physical keypad or a graphical keypad. By processing DTMF signals the VoIP hardware device 48 can then determine a number dialed and decide how to proceed. The SLIC 52 also provides the ability to ring a telephone connected to it to alert the user of an incoming all, along with changing the ringing signal's frequency and cadence (i.e., tempo).

The audio CODEC 54 handles audio data format conversion. The audio CODED 54 also handles voices echo cancellation. The audio CODEC 45 is compliant with ITU-T G.711, G.722, G.723, G.728 or G.729 standards. In another embodiment, the voice CODEC 45 is a GSM codec. However, the present invention is not limited to these CODECs and other types of CODECS including video CODECS (e.g., MPEG, etc.) can also be used to practice the invention.

The USB chipset 56 handles the data being sent over the USB bus to the network devices 12, 14, 16, 17 and vice versa. As is known in the art, USB is serial connection technology that is almost universally available on computer and other network devices. USB Version 1.x allowed for 12 Mbps transfer rates, USB Version 2.0 allows for 480 Mbps transfer rates.

The USB port 62 is a connector for a USB cable. In one embodiment, the USB port 62 not only handles communications between the VoIP hardware device 48 and the network devices 12, 14, 16, 17 but also provides a network device with the necessary power needed to operate.

The Caller ID decoder chip 58 is used to trace phone numbers of incoming calls. The Caller ID decoder chip 58 includes functionality for the United States and other countries.

In the United States, the Bellcore Caller Id standard is used. The Bellcore Caller Id standard sends Caller Id data after a first ring tone and uses 1200 baud Bell 202 tone modulation. The data may be sent in Single Data Message Format (SDMF) which includes the date, time and number or in Multiple Data Message Format (MDMF) which adds a NAME field. The Bellcore Caller Id standard, is incorporated by reference.

British Telecom (BT) has also developed their own standard, which wakes up the display with a line reversal, then sends the data as CCITT V23 modem tones in a format similar to MDMF. It is used by BT, European wireless networks like the late Ionica, and some cable companies. The BT standard for Caller Id is incorporated by reference.

The Cable Communications Association (CCA) in the United Kingdom (UK) has also developed a standard which sends Caller Id data after a short first ring, as either Bell 202 or V23 tones. The data format is similar to BT's, but the transport layer is more like Bellcore. The UK CCA standard for Caller Id is incorporated by reference.

The ETSI Caller Id standards allow three physical transport layers (Bellcore, BT and CCA) combined with 2 data formats (MDMF & SDMF), plus a DTMF system and a no-ring mode for meter-reading and the like. The ETSI caller Id standards The ETSI 300 659-1 and -2, and ES 200 778-1 are incorporated herein by reference.

Nippon Telephone and Telegraph (NTT) in Japan has developed their own V23 FSK simplex system, transmitted after a short first ring. The NTT Caller Id standards are incorporated herein by reference.

The Caller ID chip 58 is used to obtain a caller ID of a number calling the line, which is transmitted by signaling between the first and second rings, normally. This data is then passed on to the software for future courses of action The FXO interface 64 receives POTS service, typically from a CO of the PSTN. An FXO interface 64 points to the CO. An FXO interface 64 provides the following primary service to a telecommunications network device at the CO: (1) on-hook/off-hook indication (i.e., local loop closure). In embodiment, the FXS interface 66 is an RJ-11 jack port. In another embodiment, the FXO Interface 64 is a RJ-45 jack port. However, the present invention is not limited to these embodiments and other embodiment can also be used to practice the invention.

As is known in the art, a Registered Jack-11 (RJ-11) interface is a four or six-wire connector used primarily to connect network devices to telephony equipment and to local area networks. As is known in the art, a Registered Jack-45 (RJ-45) interface is an eight-wire connector used commonly to connect devices onto a LAN, including an Ethernet LANs.

The FXS interface 66 delivers Plain Old Telephone Service (POTS) service from a local phone company's Central Office (CO) and is connected to subscriber equipment (e.g., telephones, modems, and fax machines). An FXS interface 66 points to a subscriber. An FXS Interface 66 typically provides the following primary services to a subscriber device: (1) dial tone; (2) battery current; and (3) ring voltage. In one embodiment, the FXS interface 66 is an RJ-11 jack port. In another embodiment, the FXS interface 66 is a RJ-45 jack port. However, the present invention is not limited to these embodiments and other embodiment can also be used to practice the invention.

In one embodiment, the FXO interface 64 is an FXO port 64 and the FXS interface 66 is an FXS port 66. However, the present invention is not limited to this embodiment and other types of interfaces or ports can be used to practice the invention.

The VoIP hardware device 48 includes both "Phone" (e.g., FXS 66) and "Customer Line" (e.g., FXO 64) ports that can be interfaced with any locally-attached telephone handset through the FXO 64 interface or any telephone number (e.g., other landlines, or mobiles) through the FXS 66 interface. The only difference between the FXO 64 and the FXS 66 is in how the device is interfaced. With local phones 16 via the FXS interface 66, users can pick up the phone and begin interaction with the system immediately. With landlines via the FXO interface 64 the system must wait until the user has picked up the phone (if ringing an external phone) or finished dialing (for calls to the gateway). From the standpoint of the VoIP hardware device 48, whether the phone attached to the FXO interface 64 is wired or wireless is completely irrelevant, as both are identically recognized.

The FXO 64 and FXS 66 interfaces are used for connections to the PSTN and telephone handsets, respectively, but mobile phones or other telephony devices are accommodated by incorporating wireless networks including Bluetooth, 802.11x, 802.16x or other wireless standards. For wireless network devices have routers built-into them, these devices communicate directly on the telephony network.

In one embodiment, the DAA 50 and SLIC 52 and pass audio information to/from the lines and a data bus known as a Pulse Code Modulation (PCM) bus for further processing (not illustrated in FIG. 3). PCM is an uncompressed sound standard that transmits at a bitrate of 64 Kbps, which is further compressed/decompressed from a CODEC for transmission/reception to/from the VoIP application 42.

A specific type of connection between VoIP hardware device 48 and the network devices 12, 14, 16, 17 are used to connect it to a network 18 is variable depending on a network interface being used and the relate locations of each.

In another embodiment, the FXO 64 or FXS 66 interfaces are built into a PC card as an FXO port 64 and an FXS port 66 that are plugged into a computer's 17 modem or integrated into a laptop, similar to conventional modems. Unless a user has a router or an Ethernet crossover cable, it is not generally possible to directly connect a gateway with an Ethernet connection directly to a computer—though this can be done if both devices are connected to the Ethernet and communicate over it.

In another embodiment, a connection between the VoIP hardware device 48 and network devices 12, 14, 16, 17 over Bluetooth, 802.11x, or 802.16x networks. In the case of a remotely-connected VoIP hardware device 48 that is server/carrier-side, the communication is done over a network connection through a softphone that treats the service as a "virtual" phone line, with all of the same control and connection capabilities as a physical line under a user control.

The VoIP hardware device 48 of the present invention is different from other VoIP hardware and VoIP gateways known in the art because it works independently of any "server" as are currently used by standard Internet Telephony Service Providers or the PSTN and connects to other users on private virtual network. The VoIP hardware device 48 does not need to have a separate power adapter, as power is provided from through the USB port 62.

Figure 5:
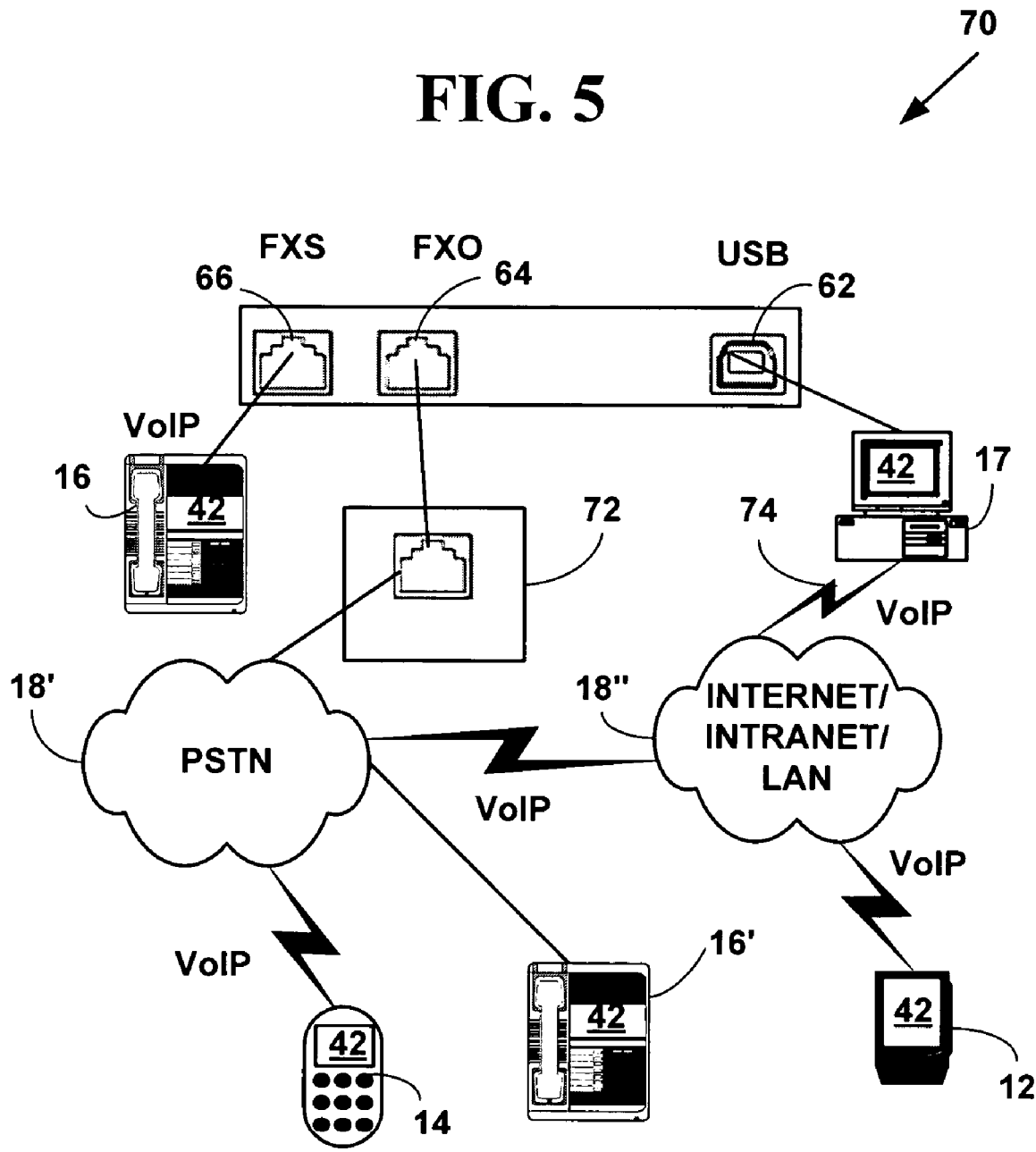
FIG. 5 is a block diagram illustrating connections for an exemplary VoIP network system.

FIG. 5 is a block diagram illustrating exemplary connections for an exemplary VoIP network system 70. In one specific embodiment, the computer 17 is connected to the VoIP hardware device 48 via the USB port 62 and includes the VoIP application 42. The VoIP hardware device 48 is connected through the FXO port 64 to the PSTN 18' via a wired telephony connection 72 at a customer premises (i.e., a wall jack, etc.). A non-mobile local phone 16 is connected to the VoIP hardware via the FXS port 66. The non-mobile local phone 16 can also be replaced with a softphone as described below operating on computer 17. A wireless mobile phone 14 is in communications with to the PSTN 18'. A non-mobile remote phone 16' is connected to the PSTN 18' with wired connection.

The computer 17 is also connected to the Internet/intranet/LAN 18″ with a wired or wireless connection. A wireless PDA 12 is connected to the network 18″. Selected ones of the network devices 12, 14, 16 and 17 include the VoIP application 42. However, the present invention is not limited to such an embodiment and other types of connections can be used to practice the invention.

In one embodiment, the computer 17 is not connected directly to the Internet 18″ to complete VoIP calls. That is, connection 74 does not exist. In such an embodiment, the VoIP hardware device 48 does not need to have an Ethernet (i.e., an RJ-45) router or a broadband connection (e.g., DSL, ADSL, CATV, etc.). In such an embodiment, the computer 17 is connected to the VoIP hardware device 48 and can access the Internet 18″ via the FXO port 64 to the PSTN 18′.

If a user is using the local phone 16 connected to the VoIP hardware device 48, the user does not need a dedicated phone line from the PSTN 18′, but instead connects to the PSTN 18′ through the VoIP hardware device 48. The local phone 16 has an FXO port 64 and FXS port 66 via the VoIP hardware device 48, allowing users to make and receive calls from a locally attached phone 16 to the FXO port 66, and to remote phone 16′ on the PSTN 18′ through the FXS port 66.

The VoIP hardware device 48 enables users to change physical locations with their existing phone line for both initiating and receiving calls, and automatically forwards incoming calls to the proper destination based on the user's presence—a local telephone/IP-phone 16, a landline or mobile phone 14, or a softphone 12. The VoIP hardware device 48 also provides, but is not limited to, customizable ring tones on a regular telephone. The VoIP application 42 interprets audio files and converts the audio files to Musical Instrument Digital Interface (MIDI) tones, or ring tone already in a standard format and it converts the tones into ring signals with varying pitch and frequency which no one's tried before on regular telephone. As is know in the art, the MIDI, an industry-standard interface used on electronic musical keyboards and PCs for computer control of musical instruments and devices.

The VoIP hardware device 48 also provides a parallel handset going off-hook feature that is used to determine when an owner of telephone line wishes to make a call, in order to disconnect the call being placed on the line to prevent eavesdropping and inconvenience to the owner of the line.

VoIP Application 42

The VoIP application 42 controls the VoIP hardware device 48, including all of the functions previously mentioned. These include the capability to change telephone line impedance settings, detect if a phone is on/off-hook, change a ringing signal, control access based on inputs such as caller ID, voice recognition, a Personal Identification Number (PIN) number, or IP address. In addition, the VoIP application 42 can be used to create customized rules and scripts to route incoming calls, and can initiate and receive calls on any of the attached telephony devices, including locally-attached handsets and remote phones. In the case of a server/carrier-side gateway, this VoIP application 42 runs independently on gateways/servers without client control/access.

The VoIP application 42 is also responsible for VoIP communication through the communications network 18. The VoIP application 42 relays audio/video data coming/going to the network devices 12, 14, 16, 17 attached to the VoIP hardware device 48 with the VoIP audio connection. This VoIP connection itself may be further connected to either another network device, such as another telephone including another user device or softphones or IP phones on the communications network 18.

These softphones include generic SIP-based softphones operating on a variety of computer platforms, softphones running on mobile phones based on Java Mobile or Microsoft SmartPhone technology, or Palm/Pocket PC PDAs operating on an IP network. IP phones such as integrated SIP IP telephones can also be used to connect to the VoIP session on the network through the VoIP application 42's support of SIP phones (i.e., connected at a remote location). Non-SIP softphones could also be included through programmed extensions, for services such as Skype or Peerio (i.e., connected directly on the same computer as the gateway). In the case of a connection to a remote server/carrier-side gateway, the client VoIP application 42 would connect by emulating a softphone to enable "virtual" phone line capabilities identical to those offered by a locally-connected gateway; from the point of the VoIP application 42, there is a layer of abstraction between the VoIP application 42 and the phone line—both a physical phone line connected through a client-side gateway and a "virtual" phone line are controlled the same way and have the same capabilities.

The VoIP application 42 allows network devices 12, 14, 16, 17 connected directly to the communications network 18 to initiate and receive calls to/from telephony devices connected to the gateway (or vice versa). This functionality allows users to dial in from a PSTN number to access any of the services provided by the VoIP application 42, such as call termination through a termination provider's servers to any telephone number in the world. In addition, the VoIP application 42 would support configuring and making calls from customizable speed-dial numbers on any of the telephony devices If a voice call comes in to the VoIP application 42, it automatically tries to ring an attached telephony device attached to the VoIP hardware device 48 (e.g., the local handset). However, if no one picks up after a certain number of rings, VoIP application 42 can be programmed to automatically patch the call through to another number such as a user's mobile number using a wired telephone line, for example. The reverse is also true—a user now no longer needs to use a calling card to access a separate network—they can simply dial in to their own number and the VoIP hardware device 48 will transfer them to the VoIP network 18 (with the VoIP hardware device 48 being connected to their phone line, either locally or server/carrier-side).

The VoIP application 42 also allows for users to travel with their phone lines anywhere they have network access. By using the VoIP application 42 (with the gateway functionality optional), a user can connect to the VoIP application 42 running on a host computer and request (e.g., after their password is authenticated) that all incoming calls be redirected to their telephony device (e.g., a softphone), and that they be able to dial out on their landline (along with other gateway controls, like ringing the attached handset).

To enable full functionality and ease of use, the VoIP application 42 brings together disparate technologies that all involve connecting people together through various methods and mediums. The most basic but universal is instant messaging (IM), or basically text messaging on computers, either on a closed network or using the three existing IM networks (AOL Instant Messenger, MSN Messenger, Yahoo! Messenger).

Internet telephony is added on to the same interface (through contacts), and a file transfer component will be included as well. This will allow users to create private networks among their contacts with which to share their files, including photos, music, and videos by transferring them to their contacts live. Users looking for specific information will be able to search this private network to search for instances of such data.

Videoconferencing is a technology which allows one or both parties of a conversation to view the other's video in real-time by using webcams or other cameras with video capture utilities. The H.264 video codec enables ordinary users to experience hassle-free video streaming in the same application as their chat and phone clients. Social networking is a relatively new concept which involves linking together users' contacts to network with the friends of their friends and meet new people. The contacts from the IM client will be imported to the social networking site, where users can post their profiles, search for others, view recommendations, and find connections to others through their friends' contact lists.

In order to accomplish these tasks, the VoIP application 42 includes advanced technology to improve performance. These measures include using dynamic data compression for the voice transmission based on the available bandwidth, so that quality is always maximized.

To ensure that all of the data that is being transferred back and forth over the network is secure, the VoIP application 42 uses AES or RSA public key encryption with large key lengths (e.g., 2,048 bits or more) to protect all text messages, media streams, and files being transferred and provide secure communications. The VoIP application 42 also uses the other security methods (e.g., MD5, TLS, SSL, IPsec, etc.) to provide secure VoIP communications. Users have the option to record any data in their session they would like, such as audio conversations or IM chats, while the client by default will record logs of all transactions (i.e. incoming/outgoing calls, phone number's, duration, cost, destination).

One problem with data networks and IP 28 based networks including the Internet 18, is that the NAT traversal firewall described above is used to allow multiple users to use a single connection, with the result that a user cannot accept incoming connections. The VoIP application 42 works around this type of firewall by using ports that are not blocked, or requesting the help of another network device 12, 14, 16, 17 or server on the communications network 18 that can serve as its proxy or helps VoIP application 42 discover what it's actual IP 28 address is.

When it comes to voice telephony, users require dependable service and are willing to pay for it. To ensure Quality-of-Service (QoS) voice data (packets) must somehow take priority over other data if congestion occurs on the network. The c VoIP application 42 solves the QoS problem at a client side by making sure that the VoIP data is sent/received and processed ahead of any other queued data requests.

In addition to compression, a VoIP connection needs to be made resistant to the echoes that regularly occur when you get feedback and encounter latency issues on packet-switched networks through adaptive VoIP application 42 that cancels this out.

Users today are used to a number of features on their traditional phone, and these will all be emulated and extended in the VoIP application 42. Some examples of this are N-way conferencing call, voicemail, call hunt and follow-me services, and automatic call distribution. Call conferencing allows users to speak with more than one person in the same conversation, which can be setup by doing multicast streaming to all of the recipients. Voicemail can be stored on the host computer's hard disk after recording, and from there can be accessed by putting the recorded audio file in an email, on the web, or on the server for someone to call later and answer. Call hunt allows multiple logins to the service and rings all when an incoming call is detected, whereas follow-me is the same service but it rings the phones in order if the previous one did not pick up. Automatic call distribution is a technique used in premises with a large number of lines coming in to place users in a queue if operators aren't available to take the call. The VoIP application 42 can do this even more efficiently, by allowing multiple calls to come in at once and having them queued on the host's client.

In order to form private networks, users need to be able to have some mechanism by which their peers can be contacted even when their IP address is not known from before (as is the case with dial-up connections where IP addresses change every time). By using the existing EM networks which have server-based sign-ons, the VoIP application 42 includes a means for such bootstrap connectivity to contacts as a backup in case the client's own discovery protocol or searching through a connections of pre-stored-IP 28 address peers fails to find a match. Such a protocol is distributed search-based, with support for peer discovery initially, and then file/social networking through the same means.

When using public wireless Internet access points or using the VoIP application 42 on a LAN, a method of peer discovery based on DNS known as "zeroconf" networking is used to find the resources of other clients on the same network, which can then be communicated with.

A useful extension for social networking is for its use to make recommendations based on user preferences. A list is created of the user's favorite books, movies, play lists, bookmarks, blogs, and music which are then shared with others. Other users who share these interests will then be able to be notified of a match and see which items they don't have in common.

Users are given the option to use the VoIP application's 42 integrated voice recognition technology which had adaptive learning capabilities to enable users to remotely access and control their gateways. The reverse is also possible; text-to-speech. These solutions come with two built-in voices that can be used to synthesize speech. These would be mostly used for listening to email or reading out a contact list over the phone.

As a converged communications medium, the VoIP application 42 links together support for e-mail and fax in the program, so that faxes can be sent and received to/from regular phone lines with fax machines. A Short Message Service (SMS)/WAP gateway is used for sending content to phones and having phones access controls while mobile. For example, users could configure alerts to be sent to their mobile phone with VoIP application 42 or even carry out a 2-way chat conversation via SMS. Access would also be available to all features from a centralized website as well as through e-mail and SMS.

On corporate PBXs, users would be able to put calls on hold, transfer them, or forward them to other extensions (in this case, users). The VoIP application 42 includes an Interactive Voice Response (IVR) system and configurations to allow users to easily setup a setup to route calls. The IVR service allows a user presence to be established and maintained permanently regardless of whether or not a host computer is online by using servers to store and keep updated contact information incase the host cannot be contacted directly. For example, in the case of a power failure, the VoIP application 42 running on the server would automatically forward any incoming calls to a user's cell phone, and users would be able to access their phone line by using an access number.

The actual voice data can be transmitted using UDP 34 packets. Since the VoIP application 42 also acts as a SIP server, it can send and receive calls from any other computer connected to the Internet by using the VoIP application 42.

By joining users of the VoIP application 42 together a network of nodes can be formed virtually, where each node consists of the users' gateways, VoIP application 42, and network connections. By going through such a network, users can interconnect their gateways and make free node-to-node calls from any telephony device anywhere in the world. The exact nature of this network does not matter; while it is best suited to a peer-to-peer (P2P) topology, a server-centric topology can also be used and has additional benefits in terms of reliability. The P2P network can also automatically route calls to other users based on a sharing system whereby users open up their nodes to others, and thereby increase their sharing level which they can use to make their own calls.

As is known in the art, under the P2P network model, two or more peer devices (e.g., FIG. 6 VoIP gateways 86, 88) use specialized software applications (e.g., VoIP application 42) to communicate and share data directly. Each peer device is considered an equal in terms of responsibilities and each acts as both a "client" for its own requests and a "server" to other peer devices in a P2P network. Each peer device makes a portion of its own resources (e.g., a directory on a hard drive, communication bandwidth, etc.) available to other peer devices.

Unlike a client-server network (e.g., the Internet, etc.) a P2P network typically does not include any centralized servers. A P2P network comprises N-number of peer devices that communicate directly without such centralized. However, only M-number of peer devices, where M is less than N, will ever be active at any given instance of time. Unlike the always-on, centralized servers in a client-server network, peer devices in a P2P network are only available to other active peer device when they are turned on and running the specialized software application that allows communication with other peer devices.

P2P topology is built from the ground-up to ensure fast searches across the entire network and will optimize itself to store data efficiently. By using distributed hash tables, binary search trees, and inverted indexes, and dynamically allocating hosts to serve a particular set of data, information can be stored and retrieved relatively quickly.

An overlay network coordinates with the P2P topology to reduce latency and improve routing of data between nodes to avoid congested routes and find the shortest path and obtain and maintain maximum flow between nodes, a task normally maintained by routers at a lower level on the Internet.

Since not all users may have their own phone lines, the VoIP application 42 offers the ability to pay to terminate calls anywhere in the world via a carrier and also have a phone number on the PSTN that is mapped to a user home computer/phone.

Existing VoIP gateway servers can be bridged to a gateway server that interconnects the telephone/telephone number to the instant-messaging network in both directions. Users on the IM network will be able to see the user's phone as a contact if they are logged on, and users will be able to pick up their phone and dial a contact on the IM network directly.

An alternate configuration is for the cellular networks to have support for connection to a VoIP built-in network, so that VoIP users can initiate a call to a gateway server and have it terminated on either a data or cellular voice connection to the user, and vice versa: the cellular user could dial a VoIP user from their phone and the cellular gateway would patch them through over a direct IP-to-IP or cellular voice-to-IP connection using VoIP application 42.

The P2P system maintains a rating system for each user that is not only part of the system, but that has ever connected in to the system or been connected out from the system. It includes all phone calls, IMs, and e-mails, and links these to a user's identity with their phone number, email address, IM address, and VoIP address. User's ratings will affect their associated communications, and the communications a user has will influence their ratings. User's identities will be linked together so that any communication between them will affect the other's. In relation to marking communications as SPAM/SPIT/SPIM, the more users that agree with you, the stronger your rating becomes, and vice versa. This maintains the level of privacy on the network without completely blocking uninitiated incoming communication. In one embodiment, the VoIP hardware device 48 and VoIP application form a structured hierarchical overlay P2P network.

P2P nodes including the VoIP hardware device 48 and VoIP software device 42 share both bandwidth and hard disk space and are hierarchical in nature, with load balancing between nodes. Latencies and reliability between nodes are measured so that data can be routed through peers faster than through a default internet routing scheme (i.e., Internet Service Provider (ISP) interconnections using pre-determined routing methods so a shortest path on the Internet 18 isn't necessarily and often isn't a default path).

The P2P structured overlay network uses distributed hash tables on multiple levels of a hierarchy to prevent flooding the P2P network and for storage/retrieval. P2P nodes with more resources (i.e., bandwidth, disk space, memory, processor speed, uptime) are trusted with serving more than lower-level nodes. The hierarchical tree structure is balanced and lower level nodes only know about the layer above them. P2P nodes are kept updated with new members via the hash table. P2P nodes can replicate data if demand is too much, or split files into chunks. P2P data is organized so a P2P node always knows where to look for information without searching the entire P2P network.

The P2P virtual overlay network also user rating system. All P2P users using start off with zero rating, as it is P2P activity increases, a P2P rating increases. Interaction with higher rated users increases rating more than interaction with lower rated users. In one embodiment, "valid" indicates an actual conversation took place, or an e-mail was sent and a reply received, or a IM or SMS messaging conversation took place, etc. this part is automatic. A user also has the ability to mark a user as a spammer (i.e., an unsolicited call/message/email marked as a spammer Blocking is separated from spam. For incoming messages/emails, etc. the P2P network is searched for both a sender's id and the actual content of a message. The P2P includes web mail and hosted server solutions that bridge to the P2P network so that user can maintain blocking and spam settings across multiple network devices 12, 14, 16, 17.

The present invention allows individuals to use normal phones/landlines and a network (such as the Internet) to make free and direct phone calls to the phones of other gateway users anywhere in the world. Users are able, using the VoIP hardware device 48 and the VoIP application 42 on their own network devices, to setup their own private telephone network of nodes and gateways with interfaces to and from their PSTN landlines.

User have the ability to have full control over incoming and outgoing calls, in addition to network connectivity through their own network devices that individual users can have full control over their communications. The VoIP hardware device 48 and the VoIP application 42 as a VoIP gateway itself has the full capabilities of an IP-Personal Branch Exchange (IP-PBX), including both PSTN and network connectivity.

The present invention takes an Internet telephony gateway, traditionally managed by a telephony company on the PSTN or Internet, and brings it directly to the user under their control, without the need for third-party hardware or servers, thereby providing a virtual private network infrastructure interconnecting plural private VoIP gateways including the VoIP hardware device 48 and the VoIP application 42. The VoIP hardware device 48 and the VoIP application 42 can be configured to enable access from a remote location or to other users either dialing in or dialing out to/from the gateway (sharing the line).

Through a network connection to a VoIP termination server on the PSTN or Internet, the VoIP hardware device 48 and the VoIP application 42 allows users to make calls to PSTN lines not on their private network at low rates from any existing line. The invention can be directly used with a telephone handset or any regular telephone or mobile phone on the PSTN, as well as users anywhere else on the network using softphones. The invention includes PSTN line voltage/current monitoring to detect when the line is/is not in use and caller ID to verify users dialing in. Phone-to-phone calls can still be made even if one or both of the users do not have their own gateways, or are not currently online. Once connected to either a remote gateway or to a VoIP termination server, the call can then be completed through to the remote user through a telephony device or softphone. The invention's VoIP application 42 uses the peer-to-peer overlay network to maintain a system of ratings for each user and any suspected spam e-mail associated with their address, allowing each peer to defend itself and make instant decisions on allowing incoming calls/instant messages from strangers The VoIP application 42 also provides, but is not limited to: (1) balancing a tradeoff between bandwidth and processor power—generally more compression means less bandwidth but more processing required, and vice Versa. VoIP application 42 nodes are able to optimize a proper mix of the two for best call quality and QoS; (2) provide a group as a contact in IM software thereby sending communications to all members of the group (this could either be a group you have defined or a real group that others have joined) or receiving new data from posts by members of the group (i.e., subscribing); (3) looking up another party's location and local time by IP 28 address or caller id's country/area code and displaying these contacts on a time-shaded map of the world; (4) asynchronous communications on an IM network to allows data to be stored on the IM network so that offline users can still be communicated with—like email, so if a user is not online a VoIP server/P2P network will store it until the user logons again. Also, even if the user is online the VoIP application 42 has the ability to leave a text/voice message so that sending to them doesn't require their authorization or disturb them.

In one embodiment, the VoIP hardware device 48 comprises a gateway, including, but not limited to a VoIP gateway. However, the present invention is not limited to such an embodiment and the VoIP hardware device 48 can be included in other than a gateway to practice the invention.

In such an embodiment, the VoIP gateway is used to communicate with other VoIP gateways including the same VoIP hardware device 48 and VoIP application 42 to provide virtual private VoIP gateway to VoIP gateway communications. The VoIP gateways provide a virtual private network infrastructure interconnecting plural private VoIP gateways.

Figure 6:
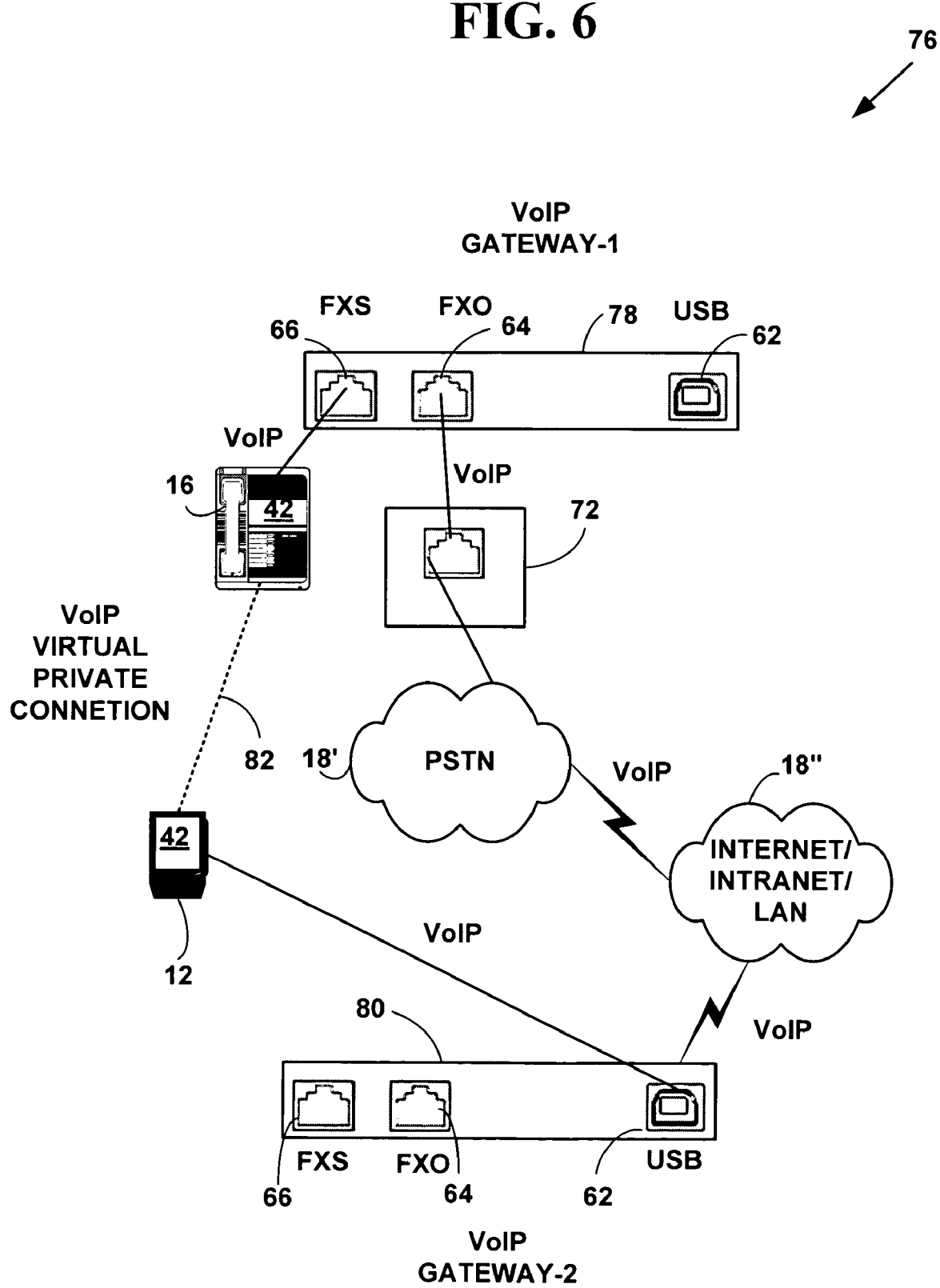
FIG. 6 is a block diagram illustrating an exemplary virtual private network infrastructure interconnecting private VoIP gateways.

FIG. 6 is a block diagram 76 illustrating an exemplary virtual private network infrastructure interconnecting private VoIP gateways. A wired non-mobile phone 16 without a dedicated telephone line that includes VoIP application 42 and that is connected to VoIP hardware device 48 is functioning as a first VoIP gateway 78 initiates 78 VoIP communications with a second VoIP gateway 80. The first VoIP gateway 78 does not include a dedicated telephone line and is connected to the PSTN 18' via the FXO interface 64 but is not connected to the Internet 18". The first VoIP gateway is in communications with a second VoIP gateway 80 via a private VoIP network infrastructure 82 interconnecting the two private VoIP gateways 78, 80. A wireless PDA 12 is connected to the second VoIP gateway 80 via the USB port 62. The second VoIP gateway 80 includes another VoIP hardware device 48 and another VoIP application 42 and is connected to the Internet 18", but is not connected to the PSTN 18'.

Figure 7:
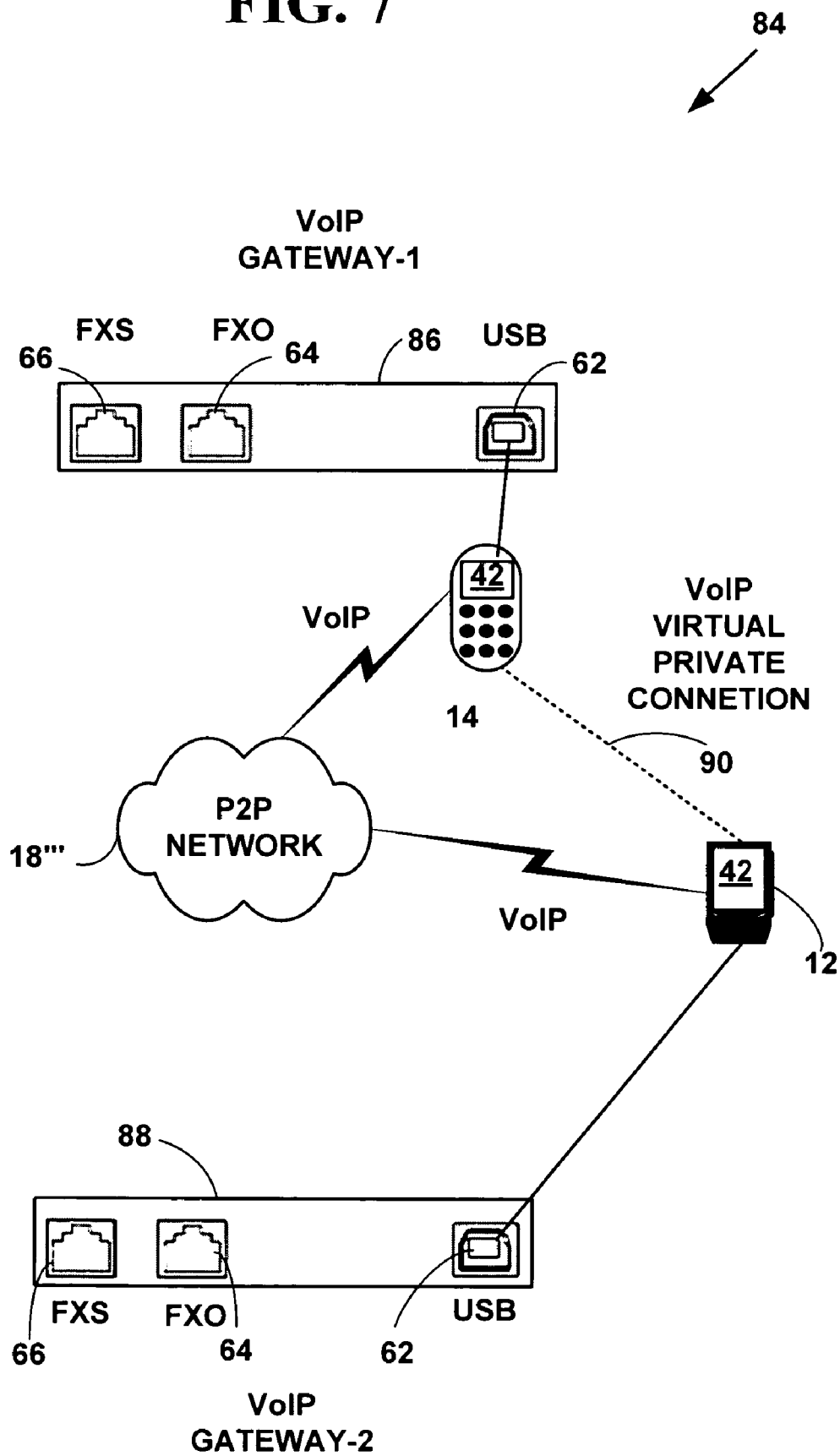
FIG. 7 is a block diagram another exemplary virtual private network infrastructure interconnecting private VoIP gateways.

FIG. 7 is a block diagram 84 another exemplary virtual private network infrastructure interconnecting private VoIP gateways via P2P network 18'''. A mobile phone 14 including the VoIP application 42 is connected to the VoIP hardware device 48 via the USB port 62 and is functioning as a first VoIP gateway 86. The mobile phone 14 is connected to a P2P network 18''' via a wireless connection. The first VoIP gateway 86 is connected to a second VoIP gateway 88 via a private VoIP network infrastructure 90 interconnecting the two private VoIP gateways 86, 88. A PDA 12 including the VoIP application 42 is connected to the second VoIP gateway 88 via USB port 62. The PDA 12 is also connected to the P2P network 18''' via a wireless connection.

FIGS. 6 and 7 illustrate exemplary connections. However, the present invention is not limited to such exemplary connections and other combinations of connections and other combinations of network devices can be used to practice the invention.

Figure 8:
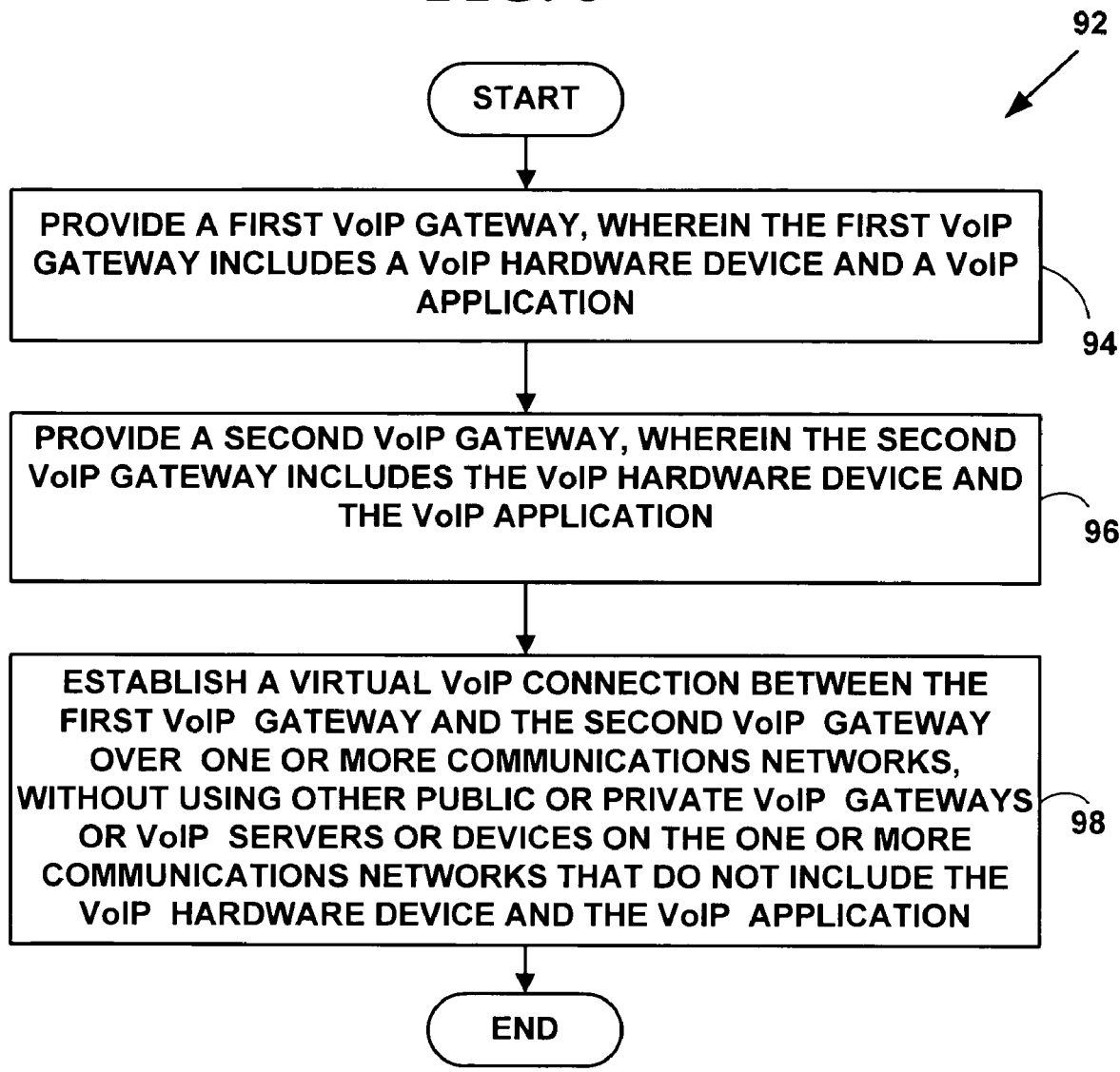
FIG. 8 is a flow diagram illustrating a method for creating a virtual private network infrastructure connection for VoIP communications.

FIG. 8 is a flow diagram illustrating a Method 92 for creating a virtual private network infrastructure connection for VoIP communications. At Step 94, a first VoIP gateway is provided. The first VoIP gateway includes a VoIP hardware device and a VoIP application. At Step 96, a second VoIP gateway is provided. The second VoIP gateway includes the VoIP hardware device and the VoIP application. At Step 98, a secure virtual VoIP connection is established between the first VoIP gateway and the second VoIP gateway over one or more communications networks, without using other public or private VoIP gateways or VoIP servers on the communications network that do not include the VoIP hardware device and the VoIP application.

Method 92 is illustrated with one specific exemplary embodiment. However, the present invention is not limited to such an embodiment and other embodiments can also be used to practice the invention.

In such a specific exemplary embodiment at Step 94, a first VoIP gateway 78 is provided. The first VoIP gateway 78 includes a VoIP hardware device 48 and a VoIP application 42. At Step 96, a second VoIP gateway 80 is provided. The second VoIP gateway 80 also includes the VoIP hardware device 48 and the VoIP application 42. At Step 98, a secure virtual VoIP connection 82 is established between the first VoIP gateway 78 and the second VoIP gateway 80 over one or more communications networks 18', 18", without using other public or private VoIP gateways or VoIP servers on the one or more communications networks 18', 18" that do not include the VoIP hardware device and the VoIP application 42

The one more communications networks for Method 92 include the PSTN 18', the Internet 18" (FIG. 6), a hierarchical overlay virtual P2P network 18''' (FIG. 10) and other types of communications networks. The secure virtual VoIP connection includes a secure virtual VoIP voice, a video connection, or a secure virtual IM, SMS or P2P connection.

Figure 9:
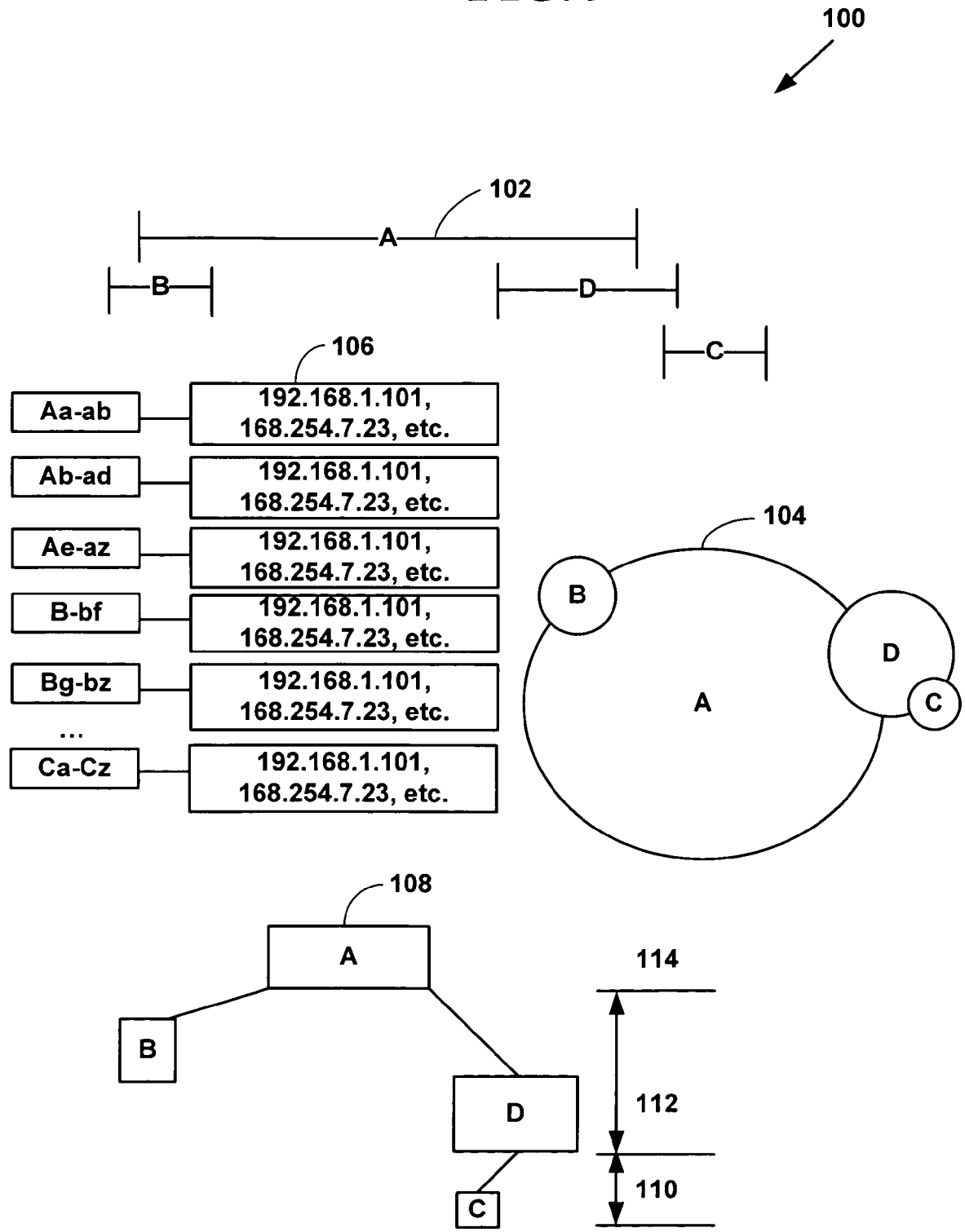
FIG. 9 is a block diagram illustrating a structured overlay P2P network.

FIG. 9 is a block diagram illustrating an exemplary hierarchical overlay P2P network 100. The hierarchal overlay structure is illustrated graphically 102 and with a Venn Diagram 104. A distributed hash table 106 is also illustrated. Level one 108 in the hierarchical overlay structure a lowest level with the least resources but the most nodes (e.g., A, B, C). At each higher level, 110, 112 there more resources per node, but less nodes (e.g., (A, B), (A)).

FIG. 10 is a flow diagram illustrating a Method 114 for or creating a virtual private network infrastructure connection for VoIP communications. At Step 116, VoIP a communications request is sent from a first VoIP network device to a second VoIP network device over a communications network. The first VoIP network device and the second VoIP network device each include and a VoIP session application. At Step 118, a VoIP communications response is received from the second VoIP network device on the first VoIP network device. At Step 120, a virtual VoIP connection is established between the first VoIP network device and the second VoIP network device over the communications network, without using other public or private VoIP gateways or VoIP servers on the communications network that do not include the VoIP session application.

Method 114 is illustrated with one specific exemplary embodiment. However, the present invention is not limited to such an embodiment and other embodiments can also be used to practice the invention.

In such an exemplary embodiment at Step 116, VoIP a communications request is sent from a first VoIP network device (e.g., 12) to a second VoIP network device (e.g., 17) over a communications network 18. The first VoIP network device 12 and the second VoIP network device 17 each include and a VoIP session application 42. At Step 118, a VoIP communications response is received from the second VoIP network device 17 on the first VoIP network device 12. At Step 120, a secure virtual VoIP connection is established between the first VoIP network device and the second VoIP network device over the communications network without using other public or private VoIP gateways or VoIP servers on the communications network that do not include the VoIP session application 42. The secure virtual connection includes a VoIP voice, video, IM, SMS or P2P secure virtual connection.

The methods and systems described herein provide at least, but are not limited to: (1) least cost routing by automatically determining how to make a VoIP voice call by using a cheapest option available (e.g., if a network device 12, 14, 16, 17 has access to a VoIP gateway with VoIP hardware application 48 and VoIP application 42 that can initiate the VoIP call, use that VoIP gateway instead of paying PSTN or Internet carrier; (2) a virtual softphone line instead of a physical FXO 64 connected line so the network device 12, 14, 16, 17 has a VoIP connection and network device can sign on to a VoIP server from the softphone and share it with others (i.e., with all the same functionality as a physical line) without having to disclose a password, etc.); (3) call screening when a visitor calls another user with the VoIP line, the VoIP line's caller id will be blocked and the called party will hear the visitors number/user's id and decide whether to accept the call or not; (4) IVR menus so callers can input choices via DTMF and the VoIP hardware can respond accordingly; (5) push to talk VoIP capabilities so upon push of a physical or graphical button a voice would be transmitted to another party and a conversation started similar to a full-duplex walkie-talkie or intercom; (6) VoIP gateway bridges to IM-based servers and cellular carrier-side servers that register all users on cellular and IM networks so that users using regular phones can call contacts using softphones, and users on softphones can call users who just have a regular phone; (7) a PSTN number assigned to a VoIP hardware device 48 that not only allows others to call thru VoIP capable network device 12, 14, 16, 17 but allows a user to dial on to get access to get access to the communications network 18 and a user account (e.g., verified by caller id, etc.) so online users can be contacted from a mobile phone 14, etc., or check voicemail or other features offered.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A Voice over Internet Protocol (VoIP) system with one or more processors, comprising in combination:
   a serial line interface circuit (SLIC) configured for interfacing with a telephone handset, detecting when the telephone handset is off hook and initiate ringing on the telephone handset for voice calls;
   a data access arrangement (DAA) circuit configured for connecting to a telephony network and initiating and receiving voice calls through the telephone handset;
   an audio coder/decoder (CODEC) for encoding and decoding voice information for VoIP voice calls;
   a universal serial bus (USB) for providing Internet Protocol (IP) communications for VoIP voice communications between the VoIP system and a network device and providing the network device with operating power;
   a USB port for accepting a USB cable to connect a network device to the USB port;
   a caller identification decoder for providing caller identification of an incoming voice call;
   a foreign exchange office (FXO) interface for interfacing with a telephony switch on a telephony network and for providing an off-hook and an on-hook indicator to a network device;
   a foreign exchange solution (FXS) interface providing voice calls to and from the telephony network and providing dial tone, battery current and ring voltage;
   a peer-to-peer (P2P) VoIP application for providing VoIP voice communications via a communications network using Internet Protocol (IP) data packets via the USB port, FXO interface or FXS interface,
   wherein the VoIP system allows the network device to provide and control VoIP voice communications via virtual private network infrastructure interconnecting other network devices using the same VoIP system using IP data packets on the communications network but without using any public VoIP gateways or any public VoIP services on the communications network; and a plurality of P2P gateways each with one or more processors and including the P2P VoIP application, wherein the plurality of P2P gateways communicate and share data directly with each other, provide a P2P networking model for VoIP communications on the communications network and provide private P2P VoIP communications on the communications network.

2. The VoIP system of claim 1 wherein the voice communications are secure voice communications.

3. The VoIP system of claim 1 wherein the P2P VoIP application provides connections to Instant Messaging (IM) services or Short Messaging Services (SMS).

4. The VoIP system of claim 1 wherein the P2P VoIP application provides network address translation (NAT) traversals for P2P VoIP voice communications.

5. The VoIP system of claim 1 wherein the P2P VoIP application provides private peer-to-peer (P2P) VoIP communications.

6. The VoIP system of claim 1 wherein the P2P VoIP communications include a hierarchical overlay P2P VoIP communications with a P2P rating system.

7. The VoIP system of claim 1 wherein the VoIP system comprises a private P2P VoIP gateway used between the network device and the communications network, wherein the private P2P VoIP gateway connects the network device to a plurality of other P2P VoIP gateways including the same P2P VoIP system to provide virtual private P2P VoIP gateway to P2P VoIP gateway communications.

8. The VoIP system of claim 1 further comprising a computer readable medium for causing one or more processors to execute instructions for a P2P VoIP application providing secure private P2P VoIP voice communications via the communications network using Internet Protocol data packets via the USB port, FXO interface or FXS interface.

9. The VoIP system of claim 1 wherein the VoIP system provides a virtual private network infrastructure interconnecting the network device and other network devices connected to other VoIP systems.

10. The VoIP system of claim 1 wherein the VoIP system provides multi-media communications, including voice, video and data between the network device and other network device connected to the VoIP system.

11. A Voice over Internet Protocol (VoIP) system, comprising in combination:

a Peer-to-Peer (P2P) VoIP hardware means with one or more processors for connecting a network device to a communications network via a universal serial bus (USB) port, a foreign exchange office (FXO) port or a foreign exchange solution (FXS) port; and a P2P VoIP software application means for providing secure VoIP communications via the communications network using Internet Protocol (IP) data packets via the VoIP hardware means, thereby providing a personal IP private branch exchange (PBX) for secure VoIP communications;

wherein the VoIP system connects to other VoIP systems including the same P2P VoIP hardware means and the same P2P VoIP software application means to provide and control VoIP voice communications via a virtual private network infrastructure interconnecting the VoIP system with the other VoIP systems using Internet Protocol (IP) data packets on the communications network but without using any public VoIP gateways or any public VoIP services on the communications network; and a plurality of P2P gateway means each with one or more processors and including the P2P VoIP software application means, wherein the plurality of P2P gateway means communicate and share data directly with each other, provide a P2P networking model for VoIP communications on the communications network and provide private P2P VoIP communications on the communications network.

12. A method for creating a virtual private network infrastructure connection for Voice over Internet Protocol (VoIP) communications, comprising:

providing a first Peer-to-Peer (P2P) VoIP gateway, wherein the first P2P VoIP gateway includes a P2P VoIP hardware device with one or more processors and a P2P VoIP application;

providing a second P2P VoIP gateway, wherein the second P2P VoIP gateway includes the same P2P VoIP hardware device with one or more processors and the same P2P VoIP application as the first P2P VoIP gateway; and establishing a secure private virtual P2P VoIP connection between the first P2P VoIP gateway and the second P2P VoIP gateway over one or more communications networks, using Internet Protocol (IP) data packets on the one or more communications networks but without using any public or private VoIP gateways or VoIP servers on the one or more communications networks that do not include the same P2P VoIP hardware device and the P2P VoIP application included on the first P2P VoIP gateway and second P2P VoIP gateway, wherein the first and second P2P VoIP gateways communicate and share data directly with each other, provide a P2P networking model for VoIP communications on the communications network and provide private P2P VoIP communications on the communications network.

13. The method of claim 12 further comprising a computer readable medium having stored therein instructions for causing one or more processors to execute the step of the method.

14. The method of claim 12 wherein the P2P VoIP hardware device comprises a P2P VoIP hardware means for connecting the first and second P2P VoIP gateways to the communications network via a universal serial bus (USB) port, a foreign exchange office (FXO) port or a foreign exchange solution (FXS) port.

15. The method of claim 12 wherein the P2P VoIP hardware device and the VoIP application provide a personal Internet Protocol private branch exchange (PBX) for secure VoIP voice calls.

* * * * *